United States Patent
Fishwick

(10) Patent No.: US 8,730,236 B2
(45) Date of Patent: May 20, 2014

(54) COMPRESSION OF A TESSELLATED PRIMITIVE INDEX LIST IN A TILE RENDERING SYSTEM

(75) Inventor: Steven Fishwick, Kings Langley (GB)

(73) Assignee: Imagination Technologies, Limited, Kings Langley, Hertfordshire (GB)

( * ) Notice: Subject to any disclaimer, the term of this patent is extended or adjusted under 35 U.S.C. 154(b) by 20 days.

(21) Appl. No.: 13/416,665

(22) Filed: Mar. 9, 2012

(65) Prior Publication Data

US 2012/0229464 A1 Sep. 13, 2012

(30) Foreign Application Priority Data

Mar. 9, 2011 (GB) .................................. 1104066.4

(51) Int. Cl.
*G06T 15/30* (2011.01)
*G06T 17/20* (2006.01)
*G06T 15/00* (2011.01)

(52) U.S. Cl.
USPC .......................................... 345/423; 345/419

(58) Field of Classification Search
USPC .................................. 345/530, 418, 419, 423
See application file for complete search history.

(56) References Cited

U.S. PATENT DOCUMENTS

| | | | |
|---|---|---|---|
| 5,864,342 A * | 1/1999 | Kajiya et al. .................. | 345/418 |
| 2001/0055032 A1 | 12/2001 | Saito et al. | |
| 2011/0267346 A1* | 11/2011 | Howson ........................ | 345/423 |

FOREIGN PATENT DOCUMENTS

| | | |
|---|---|---|
| GB | 2 321 360 | 7/1998 |
| WO | WO 2008/008613 A3 | 1/2008 |
| WO | WO 2009/128660 A3 | 10/2009 |

OTHER PUBLICATIONS

Eisenacher et al. "Real-Time View-Dependent Rendering of Parametric Surfaces." ACM, I3D '09 Proceedings of the 2009 Symposium on Interactive 3D Graphics and Games. Mar. 1, 2009.*

* cited by examiner

*Primary Examiner* — Jacinta M Crawford
(74) *Attorney, Agent, or Firm* — Michael S. Garrabrants

(57) ABSTRACT

A method and apparatus for comprising primitive data generated by tessellation of patches in a three-dimensional computer graphics rendering system receives domain point indices for a first primitive in a list of primitives defining the tessellated patch, stores the domain point indices for the received primitive, compares domain point indices of a next primitive in the list with stored domain point indices and determines any matches, stores domain point indicates of the next primitive or, if a match was found, stores a reference to the position of the matched index, receives domain point indexes of the next primitive in the list and repeats the step until each primitive in the list has been compressed.

24 Claims, 19 Drawing Sheets

Bezier Patch

Bezier Patch

Tessellation of the domain points of a patch

Geometry processing phase of a tile based rendering system extended
to include programmable tessellation Example triangle strip mesh D3D11 tessellated triangular patch using triangular primitives and unequal edge tessellation factors D3D11 tessellated quad patch using triangular primitives with domain point indexing D3D11 tessellated quad patch using triangular primitives with primitive indexing

D3D11 tessellated patch using line primitives with domain point indexing
FIG. 10
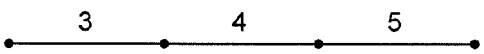
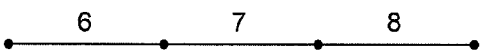
D3D11 tessellated patch using line primitives with primitive indexing
FIG. 11

D3D11 tessellated quad patch using triangular primitives with shaded tile region overlaid Tiling triangular primitives against a shaded tile region

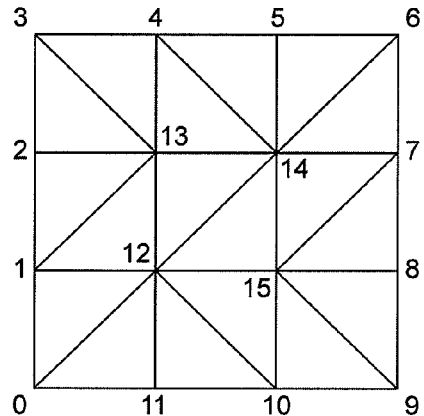

| Uncompressed domain point index list | Domain point index list using an index buffer | Index buffer compressed bit stream |
|---|---|---|
| 0, 1, 12<br>12, 1, 13<br>13, 1, 2<br>2, 3, 13<br>3, 4, 13<br>13, 4, 14<br>14, 4, 5<br>5, 6, 14<br>6, 7, 14<br>14, 7, 15<br>15, 7, 8<br>8, 9, 15<br>9, 10,15<br>15, 10, 12<br>12, 10, 11<br>11, 0, 12<br>12, 14, 15<br>12, 13, 14 | 0, 1, 12<br>[2], [1], 13<br>[2], [1], 2<br>[2], 3, [0]<br>[1], 4, [2]<br>[2], [1], 14<br>[2], [1], 5<br>[2], 6, [0]<br>[1], 7, [2]<br>[2], [1], 15<br>[2], [1], 8<br>[2], 9, [0]<br>[1], 10,[2]<br>[2], [1], 12<br>[2], [1], 11<br>[2], 0, [0]<br>[2], 14, 15<br>[0], 13, [1] | 00000000000000, 00000000000001, 00000000001100<br>100, 101, 00000000001101<br>110, 101, 00000000000010<br>110, 00000000000011, 100<br>101, 00000000000100, 110<br>110, 101, 00000000001100<br>110, 101, 00000000000101<br>110, 00000000000110, 100<br>101, 00000000000111, 110<br>110, 101, 00000000001111<br>110, 101, 00000000001000<br>110, 00000000001001, 100<br>101, 00000000001010, 110<br>110, 101, 00000000000100<br>110, 101, 00000000001011<br>110, 00000000000000, 100<br>110, 00000000001110, 00000000001111<br>100, 00000000001101, 101 |

Index buffer compression of a tessellated quad patch using triangular primitives

FIG. 14

D3D11 domain point prediction of the next domain point in line primitive tessellation of a quad patch D3D11 domain point prediction of the next domain point in line primitive tessellation of a quad patch at the start of a new row D3D11 tessellated patch using triangle primitives showing the ring structure of the domain point indices D3D11 tessellated patch using triangle primitives and domain point prediction

| Uncompressed domain point index list | Loan domain point index | Predicted domain point index [X] | Index buffer contents ([0], [1], [2], [X]) | Index buffer compressed indices with prediction |
|---|---|---|---|---|
| 0, 1, 12 | 12 | 13 | 0, 1, 12, 13 | 0, 1, 12, |
| 12, 1, 13 | 1 | 2 | 12, 1, 13, 2 | [2], [1], [X] |
| 13, 1, 2 | 13 | 14 | 13, 1, 2, 14 | [2], [1], [X] |
| 2, 3, 13 | 13 | 14 | 2, 3, 13, 14 | [2], 3, [0] |
| 3, 4, 13 | 13 | 14 | 3, 4, 13, 14 | [1], 4, [2] |
| 13, 4, 14 | 4 | 5 | 13, 4, 14, 5 | [2], [1], [X] |
| 14, 4, 5 | 14 | 15 | 14, 4, 5, 15 | [2], [1], [X] |
| 5, 6, 14 | 14 | 15 | 5, 6, 14, 15 | [2], 6, [0] |
| 6, 7, 14 | 14 | 15 | 6, 7, 14, 15 | [1], 7, [2] |
| 14, 7, 15 | 7 | 8 | 14, 7, 15, 8 | [2], [1], [X] |
| 15, 7, 8 | 15 | 16 | 15, 7, 8, 16 | [2], [1], [X] |
| 8, 9, 15 | 15 | 16 | 8, 9, 15, 16 | [2], 9, [0] |
| 9, 10, 15 | 15 | 16 | 9, 10, 15, 16 | [1], 10, [2] |
| 15, 10, 12 | MED | 13 | 15, 10, 12, 13 | [2], [1], 12 |
| 12, 10, 11 | MED+MAX | 13 | 12, 10, 11, 13 | [2], [1], 11 |
| 11, 0, 12 | 0 | 1 | 11, 0, 12, 1 | [2], 0, [0] |
| 12, 14, 15 | 12 | 13 | 12, 14, 15, 13 | [2], 14, 15 |
| 12, 13, 14 | MED+MAX | 15 | 12, 13, 14, 15 | [0], 13, [1] |

Index buffer compression of a tessellated quad patch with domain point index prediction derived from the lone apex

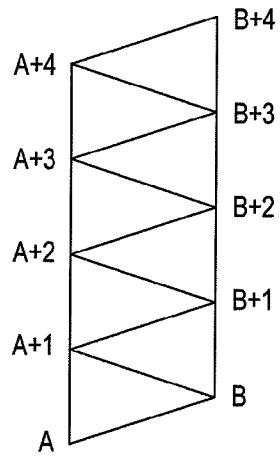

| Uncompressed domain point indices | Lone Apex | Predicted domain point index [X] | Cache contents ([0], [1], [2], [X]) | Index buffer compressed indices with prediction |
|---|---|---|---|---|
| A, A+1, B<br>B, A+1, B+1<br>A+1, A+2, B+2<br>B+1, A+2, B+2<br>A+2, A+3, B+2<br>B+2, A+3, B+3<br>A+3, A+4, B+3<br>B+3, A+4, B+4 | B<br>A+1<br>B+1<br>A+2<br>B+2<br>A+3<br>B+3<br>A+4 | B+1<br>A+2<br>B+2<br>A+3<br>B+3<br>A+4<br>B+4<br>A+5 | -, -, -, -<br>A, A+1, B, B+1<br>B, A+1, B+1, A+2<br>A+1, A+2, B+1, B+2<br>B+1, A+2, B+2, A+3<br>A+2, A+3, B+2, B+2<br>B+2, A+3, B+3, A+4<br>A+3, A+4, B+3, B+4<br>B+3, A+4, B+4, A+5 | A, A+1, B<br>[2], [1], [X]<br>[1], [X], [2]<br>[2], [1], [X]<br>[1], [X], [2]<br>[2], [1], [X]<br>[1], [X], [2]<br>[2], [1], [X] |

Index buffer compression of repeating geometry from a tessellated patch with domain point index prediction derived from the lone apex

FIG. 20

D3D11 tessellated patch using triangle primitives showing the use of a ring number and ring offset to specify compressed domain point indices D3D11 tessellated patch using line primitives showing the use of a row number and row offset to specify compressed domain point indices Index compression block showing prior art index buffer compression method Index compression block showing the proposed index compression
with domain point index prediction method Index compression block showing the proposed index compression with domain point index prediction and index compression using base identifiers and offsets

COMPRESSION OF A TESSELLATED PRIMITIVE INDEX LIST IN A TILE RENDERING SYSTEM

This invention relates to a method and apparatus for compressing primitive data generated by tessellation of patches in a three dimensional computer graphics rendering system.

BACKGROUND TO THE INVENTION

Tessellation is used in computer graphics to convert low-detail subdivision surfaces into higher-detail primitives. Tessellation breaks up high-order surfaces into suitable structures for rendering. This approach allows a graphics pipeline to evaluate lower detail (lower polygon count) models and render in higher detail. That is to say, a surface defined by a high-order equation (e.g. cubic or quadratic) is divided into a plurality of flat primitives, typically triangles for rendering.

High order surfaces are well known within the computer graphics industry and are often referred to as "patches". These patches are functions of polynomial equations that typically define a set of control points describing the shape of a curve in terms of the parametric relationships between a variable 't' (for a curve that is plotted in two dimension) or two variables 'u' and 'v' (for a curved surface in three dimensions). FIG. 1 illustrates a Bezier patch which is an example of a high order surface type commonly used within 3D computer graphics. A point 'P' 100, on Bezier surface 110 is defined by the function of the domain co-ordinates u, v 120 (also known as the parametric co-ordinates) and the corresponding control points $k_{i,j}$ 130.

$$P(u, v) = \sum_{i=0}^{n} \sum_{j=0}^{m} A u^i (1-u)^{n-i} B v^j (1-v)^{m-j} k_{i,j}$$

Where A and B are constants defined as:

$$A = \frac{n!}{i!(n-i)!} \text{ and } B = \frac{m!}{j!(m-j)!}$$

It should be noted that values of P(u,v) lie within the volume 140, also known as the convex hull which is described by control points $k_{i,j}$ 130. It should also be noted that the Bezier patch is only an example of one possible surface formulation and that there are many other possibilities which are used in computer graphic systems.

Tessellation is a well known technique that subdivides high order surfaces/patches such as that shown in FIG. 1 into a number of adjoined primitives lying on the plane of and within the boundaries of the original surface. The subdivision scheme of the tessellator is performed in the domain of the patch, typically using a normalized (zero-to-one) coordinate system. The consequence of this is that the tessellation process is independent of any curvature present in the final surface. The domain of the patch may be a quad, triangle or line and these domains are typically subdivided into many smaller primitives such as points, lines or triangles. These primitives are defined by the interconnection of domain points, whose locations are defined by the tessellation method and settings.

FIG. 2 illustrates tessellation of the domain points for a Bezier quad patch using a binary sub-division method. The domain 200 with 16 domain points and 0.25 intervals on each axis represents the minimum number of domain points within a tessellated patch, this being the same as the number of control points required to define a Bezier surface. One level of tessellation is applied at 210 resulting in a further set of domain points being generated at intervals that lie at the mid points between the original set of points. A second level of tessellation 220 introduces a further set of points at the mid-point between the points generated at 210. This process is repeated until a suitable level of tessellation is achieved.

The level of tessellation is controlled by the tessellation application and may be determined by visual quality metrics such as how many polygons are required to give a smooth representation of a curved surface at a particular distance from the camera. Alternatively the level of tessellation applied may be determined by available computational power, with more powerful systems using higher levels of tessellation to improve visual quality. It should be noted that binary sub-division represents only one possible tessellation method and is presented here only as an example.

Microsoft's Direct3D11 (D3D11) application programming interface (API) introduces a programmable alternative to binary sub-division for tessellation within a graphics pipeline which will be used for illustration in this document. Other API's, such as OpenGL 4.0, provide similar functionality for the tessellation of high order surfaces. These programming interfaces are often accelerated by hardware. FIG. 3 illustrates the graphics pipeline required by the D3D11 API. A Vertex Shader stage 300 takes a set of individual control points for a patch and applies an arbitrary mathematical transform using programmable hardware in a manner which will be well known to those skilled in the art. The transformed control points are then passed to a Hull Shader 310 which calculates tessellation factors for the edges of the patch and applies further application defined modifications to the control points.

The edge tessellation factors for the patch are passed to a Tessellation Unit 320. Tessellation occurs in two parts, domain tessellation and connectivity tessellation. Domain tessellation subdivides the patch into a number of points known as domain points. The location of these domain points is determined by the tessellation method and supplied tessellation parameters in a similar manner to that described for FIG. 2, but methods such as those prescribed by the D3D11 API do not require the domain points to be placed at regular (e.g. power of two) intervals. Connectivity tessellation determines how the resulting domain points are combined to produce tessellated primitives according to a fixed function algorithm whose operation is defined by the D3D11 API. Detailed description of the fixed function domain and connectivity tessellation algorithms are beyond the scope of this document and are fully defined by the APIs, as will be known to those skilled in the art.

The tessellated domain points are passed to a Domain Shader 330 which combines them with the control points of the patch produced by the Hull Shader in a programmable manner. Typically the Domain Shader would apply a well known curved surface formulation such as a Bezier patch (as described above for FIG. 1) resulting in the domain points being mapped onto the patch to create primitive vertices. The resulting vertices may then be further modified using well known techniques such as displacement mapping. Displacement mapping is a technique in which the results of high order surface tessellation are displaced by a mathematical function or a height that is sampled from a texture map. The introduction of displacement mapping of vertices from a patch surface introduces the possibility that the vertices no longer reside within the convex hull defined by the control points of the patch.

For illustrative purposes embodiments of the invention will be described in terms of tessellation within a tile based rendering system although the methods disclosed are equally applicable to non tile based systems. Tile based rendering systems are well-known. These architectures subdivide an image into a plurality of rectangular blocks or tiles. FIG. 4 illustrates the architecture of a typical tile based system including texturing and shading stages.

Tile based rendering is generally split into two phases, the first of which is known as the Geometry Processing Phase 490 which performs the following operations.

First, a Primitive/Command Fetch Unit 400 retrieves command and primitive data from an external memory and passes this to a Vertex Shader Unit 401. The primitive and command data is then transformed into screen space using well-known methods such as clip/cull and projection shown in blocks 402 and 403.

This data is then supplied to a Tiling Unit 410 which inserts object data from the screen space geometry into object lists for each of a set of defined rectangular regions or tiles. An object list for each tile contains primitives that exist wholly or partially in that tile and is stored in the Tiled Screen Space Geometry Buffer 420. An object list exists for every tile on the screen, although some object lists may contain no data. It is similarly possible to envisage a system where instead of transforming the object into the screen's coordinate system for tiling, the tile could be transformed into the object's coordinate system and tiling be performed in this domain. Any common coordinate system between the tile and the geometry could be used for this purpose.

The second phase of tile based rendering is called the rasterization phase 491 which performs the following operations.

The object lists generated by the tiling unit are read from the Tiled Screen Space Geometry Buffer by a Tile Parameter Fetch Unit 430 which supplies them tile by tile to a Hidden Surface Removal (HSR) unit 440. The HSR unit removes surfaces which will not contribute to the final scene (usually because they are obscured by another surface) by processing each primitive in the tile and passing only data that is visible to a Shading Unit 450.

The Shading Unit takes the data from the HSR unit and uses it to fetch textures using the Texturing Unit 460 and applies shading to each pixel within the visible object using well-known techniques. The Shading Unit then feeds the textured and shaded data to an on-chip Tile Buffer 470. As operations are applied to an on chip Tile Buffer the amount of data traffic required external to the chip is minimized.

Once each tile has been completed, the resulting data is written to a Rendered Scene Buffer 480.

Conventional systems without tessellation typically approximate geometry, such as curved surfaces, with only a limited number of polygons in order to maintain acceptable performance. The most common application of tessellation is to use the patch as a compact representation of a larger number of polygons than would otherwise have been feasible. The more compact representation gives a substantial benefit in reducing bandwidth at the Primitive/Command Fetch (400) stage.

Tiling of a group of primitives, such as those generated from a patch, is often performed by tiling a bounding box for the group. This can require considerably less computation than would be required for tiling each primitive separately. The convex hull often forms the basis of a convenient bounding box for the primitives generated from a surface patch, however, as displacement mapping allows the primitive vertices to extend beyond the bounds of the patch's convex hull, this is not always an appropriate method for use with the D3D11 API.

The conventional method of adding programmable tessellation of high order surfaces to a tile based rendering architecture is to first tessellate every patch in the scene into primitives and apply any displacement mapping. The resulting primitives can subsequently be tiled and processed with a conventional tile based rendering pipeline. While simple, this approach requires the expansion of patch data into a large number of primitives during the early stages of the graphics pipeline. This data expansion causes a significant increase in both memory and bandwidth requirements associated with the tiled screen space geometry buffer (420), negating any benefit achieved in the primitive/command fetch, and putting the tile based system at a disadvantage compared to a non-tiled architecture that does not use a tiled screen space geometry buffer. It is therefore desirable to avoid full data expansion prior to tiling and instead store patches and to utilise a method of generating primitives from those patches.

A more efficient method of adding tessellation of high order patches to a tile based rendering architecture is described in our British Patent application no. 1007348.3 and shown schematically in FIG. 5. In this improved two-pass system, the Geometry Processing Phase 590 of the rendering pipeline is expanded to determine whether polygons that are created during tessellation of a patch exist wholly or partially within a tile. A polygon is said to exist within a tile if its final position in the scene lands within the viewable region of that tile. A polygon exists wholly within the tile if its position in the scene falls entirely within the viewable region of a tile. A polygon exists partially within the tile if at least some of the polygon falls within the viewable region of a tile. Polygons that exist wholly or partially within a tile may be wholly or partially visible within the tile or may not be visible at all in the final scene if they are obscured by other polygons. Optionally, polygons that are obscured may be detected and removed from the list of polygons that exist wholly or partially within the tile. If one or more polygons from a patch exist wholly or partially within a tile, patches, rather than polygons are stored in the object lists for the tiles. Note: if only a small number of polygons are visible from the patch it may be desirable to store the polygons to minimize the amount of data. This process of allocating geometry that exists within a tile is generally called "tiling" or "binning".

An initial tessellation pass is performed on the patch data and the locations of the tessellated primitives from each patch are determined by performing vertex shading and hull shading. If any of the primitives generated by the tessellation of a patch exist within a tile then that patch must be added to the object list for that tile in the Tiled Screen Space Geometry Buffer. By storing only the set of patch control points and the tessellation parameters required to redo the tessellation in the rasterization phase, the amount of data stored in the Tiled Space Geometry Buffer is significantly reduced when compared to the amount of data that would have been required to store the post tessellation primitive geometry. It should be noted that the patch control points may be stored after vertex and hull shading have been performed to avoid repeating those parts of the tessellation calculation during rasterization.

As complete tessellation has been performed during the tiling process it is also possible to store a list of which primitives from the patch will exist wholly or partially in the tile after tessellation. This list allows the possibility of recreating from each patch only those primitives that are required in a tile during later tessellation processing.

The Vertex Shader Unit 501 and the Hull Shader Unit 502 operate as described above in a standard D3D11 tessellation pipeline. The Hull Shader Unit passes the calculated edge tessellation factors to both the Domain Tessellation Unit 503 and the Connectivity Tessellation Unit 504, while also passing the processed control point data to the Domain Shader Unit 505.

The Domain Tessellation Unit generates domain points with associated domain point index values and the domain point Connectivity Tessellation Unit specifies a list of domain point indices from the patch which specify primitive indices and the order in which they should be connected to generate the primitives.

The primitive vertices are passed to an optional Cache Unit 506 which caches primitive vertices previously generated by the Domain Shader Unit. It should be noted that the cache is not required but the interconnected nature of the primitives that make up the tessellated patch mean that the presence of a cache can significantly reduce the number of primitive vertices that are processed through the Domain Shader unit. Where a primitive vertex is not present within the cache it is requested from the Domain Shader Unit.

The Domain Shader Unit processes only the position part of the primitive vertex data as it is the only part required in order to tile tessellated geometry. The Cache Unit passes on the primitive vertices that make up the primitives to the Clipping and Culling Unit 510 which removes any primitives outside of the visible region of the screen and optionally removes back facing and/or very small primitives that fall between sample positions. It should be noted that clipping and culling operations disrupt the regular ordering of primitives generated from tessellated patches, and that this may affect the performance of subsequent compression operations. Therefore, clipping and culling may optionally be deferred until a later stage in the pipeline.

Any remaining primitives are passed to the Projection Unit 511 that transforms the remaining primitives/primitive vertices into screen space to be tiled by the Tiling Unit 512. The Tiling Unit determines which primitives exist wholly or partially in each tile and passes a list of the domain point indices describing the primitive vertices to an optional Index Compression Unit 513.

Embodiments of the present invention are described with reference to the method of compression used in the Index Compression Unit 513. This unit is responsible for efficiently compressing the list of domain point indices used to define the primitives that exist in each tile into a compressed primitive list. This compression reduces the amount of data written to the per-tile geometry lists, decreasing storage and bandwidth requirements.

A reference to the Hull Shader output and the compressed primitive lists are then written into the Tiled Screen Space Geometry Buffer 514.

Later phases in the pipeline can use the Hull Shader output to regenerate only those primitives that exist wholly or partially within the current tile. Primitives from a tessellated patch that do not exist wholly or partially within the current tile need not be created by the tessellation process.

The present invention presents an efficient compression scheme for the list of domain point indices that arise from the tiling tessellated geometry.

Several compression schemes already exist to reduce the amount of data required to store geometry. The most common of these is the use of triangle strips. A triangle strip is an efficient method of describing connected triangle primitives that share vertices. After the first triangle is defined using three vertices, each new triangle can be defined by only one additional vertex, sharing the last two vertices defined for the previous triangle primitive. FIG. 6 illustrates an example triangle strip consisting of four connected triangle primitives. Without using triangle strips, the list of indices would have to be stored as four separate triangles: ABC, CBD, CDE, EDF. However, using a triangle strip, these can be stored as a sequence of vertices ABCDEF. This sequence would be decoded as a set of triangles ABC, BCD, CDE, DEF then every even-numbered triangle (with counting starting from one) would be reversed resulting in consistent clockwise/anti clockwise ordering of the original triangle primitives.

Triangle strips are able to effectively compress long runs of adjacent triangles but are less effective with more complex geometry. Geometry generated by the tiling of tessellated patches contains structures that reduce the effectiveness of triangle strip compression such as multiple triangles sharing a common vertex, known as a triangle fan, changes in the clockwise/anticlockwise vertex ordering of the triangle primitives and missing triangles in the sequence resulting from the tiling process. FIG. 7 illustrates a typical low level tessellation of a triangular patch into triangular primitives. It can be seen that the tessellated geometry contains multiple triangle fans and multiple changes in triangle ordering that are unsuitable for effective compression using triangle strips. Removing some of the triangle primitives from the tessellated patch (as a result of tiling) could further reduce the effectiveness of triangle strips as a compression method.

Vertex Buffers and Index Buffers are also well known in computer graphics. An illustrative example of Index Buffer compression is shown in FIG. 23 as a well known method for compressing a stream of indices. Lists of indices from recently seen primitives are stored in an Index Buffer 2320. When a new primitive is added, the uncompressed Domain Point Indices of the primitive 2310 are compared 2330 with the contents of the Index Buffer. Any index value already present in the Index Buffer can be represented by a buffer position in place of storing the full index value. Assuming the position in the Index Buffer can be described by fewer bits than the index value itself, compression is achieved 2390.

Consider a worked example of FIG. 6 compressed using an index buffer. An initial primitive ABC is read in. None of these indices are present in the buffer before the primitive is encountered. These indices must therefore be stated fully and are used to initialize the buffer. After initialization buffer position 0 contains index A, buffer position 1 contains index B, buffer position 2 contains index C. A square bracket notation indicating the position in the buffer may be used: [0]=A, [1]=B, [2]=0. The second primitive CBD can now be defined as two index buffer positions and newly encountered index D: [2][1]D. Once the buffer is full, newly arriving indices may be introduced to the buffer with a replacement policy such as first-in first-out (FIFO) or least recently used (LRU). Vertex/Index Buffers present an effective compression method for previously encountered indices but each primitive typically requires at least one index that isn't present in the buffer from earlier primitives.

Specific to the compression of tessellated geometry, Jon Hasselgren, et al. proposed an alternative method of determining which polygons may exist within each tile using a bounding box approach ("Automatic Pre-Tessellation Culling", ACM Trans. on Graph., Vol. 28, pp 19 (2009)). In this approach, interval mathematics is used to determine, for each patch, the range of possible displacements from the base patch that the tessellated surface could take if the tessellation were to be performed. Using this range of possible displacements a conservative bounding box can be created around a patch describing all of the possible locations of primitives from the patch. This bounding box can then be projected and tiled to determine in which tiles the patch may exist either wholly or partially after tessellation. While this method alleviates the need to store the expanded primitive geometry for the tessellated patch, the conservative nature of bounding boxes leads to patches being included in tiles where they will not exist either wholly or partially after tessellation. Furthermore, a bounding box for a patch is only capable of specifying that the tessellated primitives subdivided from a patch might exist inside a tile after tessellation is performed and means that unnecessary patches will be included in some tiles. These unnecessary patches result in wasted computation and rendering later in the graphics pipeline. The bounding box method also cannot identify which primitives from the tessellated patch exist within each tile and therefore performs a less optimal tiling than a method that considers each primitive from the tessellated patch individually. The calculation of tight positional and normal bounds reduces the size of the bounding box of the tessellated primitives and therefore can be used to reduce the number of tiles that are included. However, the calculation of bounds for a tessellated patch after displacement by a function and optional further displacement mapping processes is a computationally intensive process, and the result will tend towards infinite bounds for complex user programmable functions that include terms which are difficult to bound—such as random noise functions.

SUMMARY OF THE INVENTION

Embodiments of the present invention provide an efficient method and apparatus for the compression of a visible primitive index list generated by the tiling of tessellated geometry.

Tessellating every patch in the scene into its constituent primitives and applying displacement mapping prior to tiling requires substantial increases in both memory and bandwidth requirements, compared to the original patch data, due to the data expansion in the Tiled Screen Space Geometry Buffer. A patch can however be tessellated during the tiling phase to determine which primitives will exist wholly or partially within each tile. Rather than storing the large number of primitives that result from tessellation, the tiles can instead store the base patch and the tessellation parameters necessary to perform tessellation of the patch, along with a list of which primitives created by the tessellation process exist in each tile. If none of the primitives created by tessellation of a patch exist wholly or partially within the tile then the patch does not need to be stored in that tile. This technique results in significant savings in memory and bandwidth requirements when compared with storing the fully tessellated primitives from each patch. Further reductions in per tile geometry data can be achieved through compression of the list of primitives from the patch that exist wholly or partially within each tile and are stored in the Tiled Screen Space Geometry Buffer.

It is common for only some of the primitives from a tessellated patch to exist wholly or partially in a tile. Primitives from a patch may not exist within a tile because they are instead located in another tile, are occluded by other objects/primitives, have been clipped/culled due to orientation (backface culling), or because they are outside of the viewable area of the screen. The list of primitives that exist in any tile is therefore a subset of the total number of primitives in the set produced by the tessellation of a patch (where the subset may include every primitive in the set). Despite the potential for the list of primitives that exist within a tile to have arbitrary missing primitives in each patch, real world results tend to exhibit locality, i.e. if a primitive exists in a tile it is likely that adjacent primitives will also exist in the same tile. It should be noted that this locality can optionally be increased by utilizing clipping/culling operations that avoid removing isolated primitives from a tessellated patch. Using the principle of locality and knowledge of the underlying tessellated surface's geometry allows more effective compression of the list of primitives that exist within each tile than could otherwise be achieved using an application unaware compression scheme.

A sub-set of primitives from a tessellated patch may be stored as a list of the indices defining those primitives. Without compression, the number of indices required to define each primitive is equal to the number of vertices present in that primitive, i.e. a line is defined by two vertices and a triangle is defined by three vertices. A first aspect of this invention is a novel compression scheme which not only stores the previous primitive's or primitives' indices in an Index Buffer but adds one or more predicted index values which can be used in the definition of subsequent primitives. Accurately predicting index values that will be required by the next primitive in an arbitrary mesh is not possible, however knowledge of the internal structure of a tessellated patch allows the generation of useful predicted index values that can be inserted into the index buffer. This method will be referred to as "Index Buffer Compression with Prediction".

A second aspect of this invention is embodied in a second stage compression of the result of Index Buffer Compression with Prediction. In regions where the predicted value inserted into the Index Buffer is correct, the pattern of accesses into the Index Buffer will have a repeating structure. These repeating buffer access patterns arise due to the underlying geometry and the accurate predictions generated by the disclosed Index Buffer Compression with Prediction method. The repeating patterns that occur may themselves be compressed by defining the buffer access pattern that is repeating and the number of times the pattern is repeated. On long runs of repeating buffer access patterns that are common in the Index Buffer Compression with Prediction of highly tessellated patches, this "Buffer Access Pattern Compression" can significantly reduce the amount of geometry data that must be stored in each tile.

A third, and final, aspect of this invention is embodied the compression of any remaining indices that were not present in the buffer because they were not present in previous primitives and were not accurately predicted by the first aspect of this invention. These full index values may occur at the first primitive in a patch or where primitives from the patch are missing because they do not exist wholly or partially within a tile. Domain point indices may be stored as a base identifier component identifying the geometric structure along which a plurality of vertices exist and an offset along the geometric structure identifying the required vertex and it's domain point index. Multiple indices along the same geometric structure may therefore be described by a single base identifier value and multiple offset values and a minimum number of bits may be used for both the base identifier and the offset components.

BRIEF DESCRIPTION OF THE DRAWINGS

Preferred embodiments of the invention will now be described in detail by way of example with reference to the accompanying drawings in which:

FIG. 10—illustrates a D3D11 tessellated patch using line primitives with domain point indexing, created using odd partitioning and a tessellation factor of 3 applied to the detail/density, i.e. horizontal/vertical edges;

FIG. 11—illustrates a D3D11 tessellated patch using line primitives with primitive indexing, created using odd partitioning and a tessellation factor of 3 applied to the detail/density, i.e. horizontal/vertical edges;

FIG. 14—illustrates the compression of a D3D11 tessellated quad patch using an Index Buffer containing the previous primitive's domain point indices;

FIG. 20—illustrates the compression of a series of connected triangle primitives resulting from tessellation of a patch using Index Buffer Compression with Prediction derived from the lone apex;

DETAILED DESCRIPTION OF THE PREFERRED EMBODIMENTS

Tessellation of a patch results in a grid of domain points in <u,v> domain space with positions determined by the tessellation parameters of the patch and a fixed function tessellation scheme. The tessellation algorithm can create triangle, line or point primitives from a patch.

Figures 8, 9:
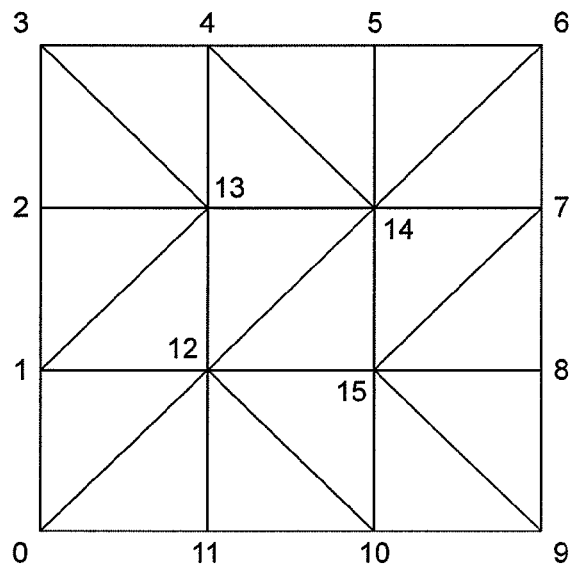
FIG. 8—illustrates a D3D11 tessellated quad patch using triangular primitives with domain point indexing, created using odd partitioning and a tessellation factor of 3 applied to each edge.
FIG. 9—illustrates a D3D11 tessellated quad patch using triangular primitives with primitive indexing, created using odd partitioning and a tessellation factor of 3 applied to each edge.

D3D11's fixed function tessellation scheme generates domain points for the patch and assigns an index to each domain point. Domain points are generated in a spiral pattern that moves along each of the outer edges of the patch and inwards until the centre of the patch is reached. Indices are numbered in the order the domain points are created and therefore also increment around a spiral from the smallest index value (i.e. 0 in this example) to the maximum index value for the tessellation level (i.e. 15 in this example). FIG. 8 shows an example D3D11 tessellation of a quad patch into triangle primitives using odd subdivision and an edge tessellation factor of three applied to each edge. The spiral pattern of the numbered domain points can be seen in this.

D3D11's tessellation's connectivity scheme uses a fixed function algorithm to connect the domain points into primitives. In FIG. 8 the tessellation connectivity algorithm has generated triangular primitives, each of which is defined using three domain points, which are referenced using the corresponding domain point indices. The method for determining the connectivity of the domain points is defined by the tessellation system used (in this case D3D11) and further discussion of this is not required for an understanding of the present invention. Those skilled in the art will understand that any connectivity algorithm may be adopted. It can be seen that, assuming clockwise triangle definitions, the tessellated surface contains triangular primitives where each primitive can be defined by three domain point indices, e.g.: {0, 1, 12}, {12, 1, 13}, {13, 1, 2}, etc. Alternatively, rather than assigning indices to the domain points, the primitives created by the tessellation connectivity process may be assigned a primitive index in the order in which they are created as shown in FIG. 9. In this, each primitive (triangle) is numbered from 0 to 16.

As well as triangle primitives, D3D11's fixed function tessellator can generate line and point primitives by defining domain points in a raster scan process that progresses sequentially across a patch before proceeding onto the next row. FIG. 10 shows an example D3D11 line primitive tessellation where odd subdivision and detail/density tessellation factors (i.e. equivalent to horizontal/vertical edge tessellation factors) of three are applied. Indices are numbered in the order the domain points are created and therefore increment in a raster scan sequence that increments along each row before proceeding to the next row. D3D11's tessellation's connectivity scheme uses a fixed function algorithm to connect the domain points into line primitives. In the case of line primitives, each primitive is defined by two domain point indices. The method for determining connectivity of domain points is defined by D3D11's tessellation connectivity algorithm. It can be seen that the tessellated surface shown in FIG. 10 contains line primitives where each primitive can be defined by two domain point indices, e.g.: {0,1}, {1,2}, {2,3}, etc. Alternatively, primitives may be assigned an identifier in the order that they are created as shown in FIG. 11 (0, 1, 2 etc).

Figure 12:
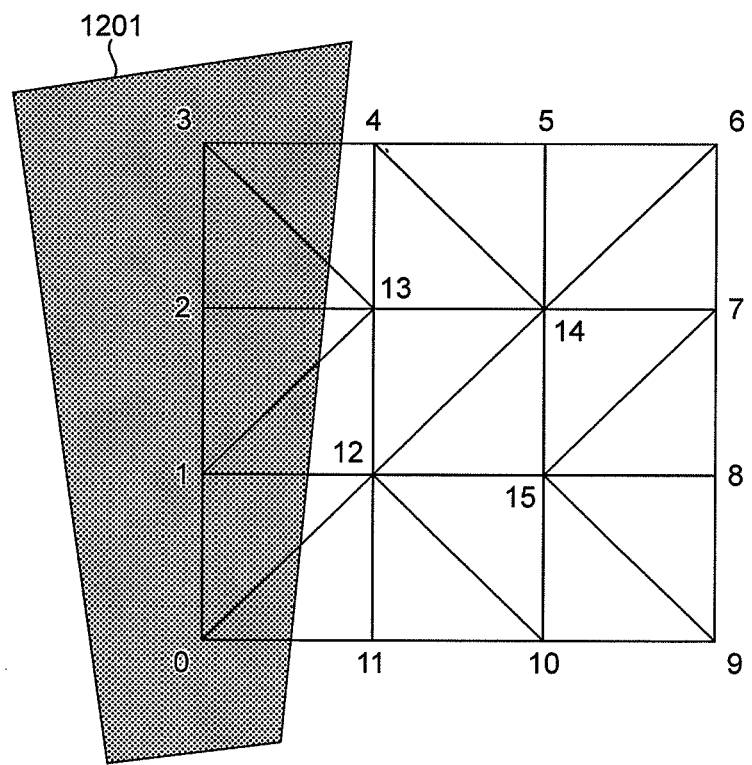
FIG. 12—illustrates tiling of a D3D11 tessellated quad patch against a shaded tile region.

In a tile based renderer it is necessary to determine which primitives from each tessellated patch exist in each tile. FIG. 12 shows the same tessellated surface described in FIG. 8, with the addition of a shaded tile region overlaid 1201. This tile region illustrates the visible region of the rectangular tile when projected into the domain of the patch i.e. the intersection of tile and patch which are visible. Primitives that are wholly or partially overlapped by the tile region can be said to exist wholly or partially within the tile and must be included in the object list for that tile. In this example, the triangles defined by indices {0, 1, 12}, {12, 1, 13}, {13, 1, 2}, {2, 3, 13}, {3, 4, 13} and {11, 0, 12} overlap with the tile region and therefore exist either partially or wholly within the tile (in this example they all exist partially within the tile). All other primitives from the tessellated patch do not intersect with the shaded tile region and therefore do not exist within the tile and are not required to display the contents of the tile during rendering. The primitives that do exist partially or wholly in the tile are added to the object list for the tile and the other primitives from the tessellated patch are not. In this example, the minimum set of primitives from the patch that may be required during rendering of the tile are stored.

A tile based rendering pipeline that addresses tessellation using a two pass tessellation process has previously been disclosed in British Patent application no. 10077348.4. In this system a first pass tessellation process identifies the patches that contain primitives that exist wholly or partially within each tile and a second tessellation pass is used during the rendering of each tile to recreate the primitives that exist in the tile from each patch. The inherent separation of the tiling phase and rendering phase in such a tile based rendering architecture requires that tiled geometry must be written out to memory until required and read back in later in the pipeline for rendering. It is therefore desirable to compress the object list data describing the geometry that exists within each tile to minimize memory requirements for storage and the associated bandwidth usage for reading/writing the primitive data to memory.

Embodiments of this invention provide an efficient method of compression of the geometry that exists within each tile. Central to the compression is the realization that the primitives that exist wholly or partially within a tile when projected into the domain of a tessellated patch will generally exhibit locality, that is, if a primitive exists in a tile it is likely that neighbouring primitives will also exist in the tile. In the case of the patches illustrated in FIG. 9 and FIG. 11, where primitives that exist in a tile are defined by a primitive index value, it is likely that locality will cause primitives with consecutive primitive indices to be stored in the same tile. These consecutive primitive indices could be readily compressed as a run of incrementing values or a run length encoding of the differences between consecutive values. Similarly, in the case of patches illustrated in FIG. 8 and FIG. 10, where primitives are defined using a structured list of domain point indices, the domain point indices could first be sorted and compressed using a similar run of incrementing values or a run length encoding of the differences between consecutive values. In both of these cases, the sorting process allows simple and effective compression to be achieved however the structure and connectivity of these domain points is lost by the index sorting process.

Figure 13:
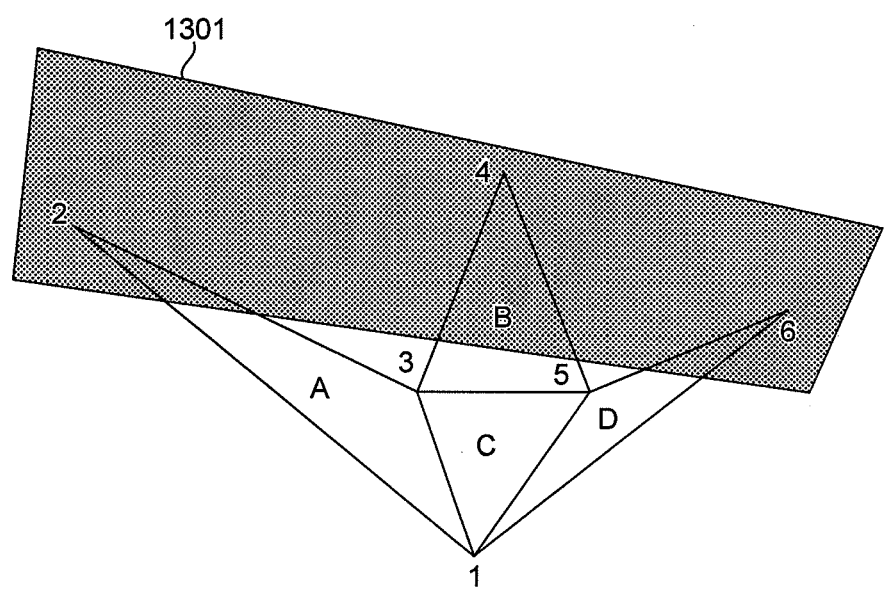
FIG. 13—illustrates where a primitive that does not exist wholly or partially within the shaded tile region are included in the tile during connectivity recalculation from a sorted list of primitive indices.

In order to use such compression schemes it is necessary to recalculate tessellation connectivity whenever the data is used at later stages of the pipeline. Furthermore, the re-calcuation of primitive visibility from a sorted list of domain point indices of primitives that exist within a tile no longer guarantees a minimum set of triangles within the tile. Consider the example shown in FIG. 13 where four triangular primitives from a patch (A, B, C and D) are tiled against a shaded tile region 1101. Primitives A, B and D partially or wholly exist within the tile and therefore the primitive indices {1, 2, 3}, {3, 4, 5}, {5, 6, 1} should be included in the tile. Primitive C is not present in the tile so should not have its domain point indices explicitly added to the tile.

If sorted compression were to be used the list of domain point indices describing primitives that exist within the tile would be {1, 2, 3, 4, 5, 6}. Despite not being explicitly added to the tile, every domain point index of primitive C (i.e. 1, 3 and 5) is already present in the sorted list of domain point indices for the tile. This occurs because the domain point indices of primitive C which does not exist in the tile are shared with the primitives A, B and D, which do exist in the tile When recalculating tessellation connectivity, the triangle C would therefore incorrectly be recreated as existing in the tile unless explicitly excluded.

The inclusion of a small number of unwanted triangles does not pose a significant overhead in some applications. Similarly, in cases where only a small number of primitives need to be excluded from a patch it may be preferable to store a list of primitives to exclude from the tile rather than a list of those to include.

Figure 1:
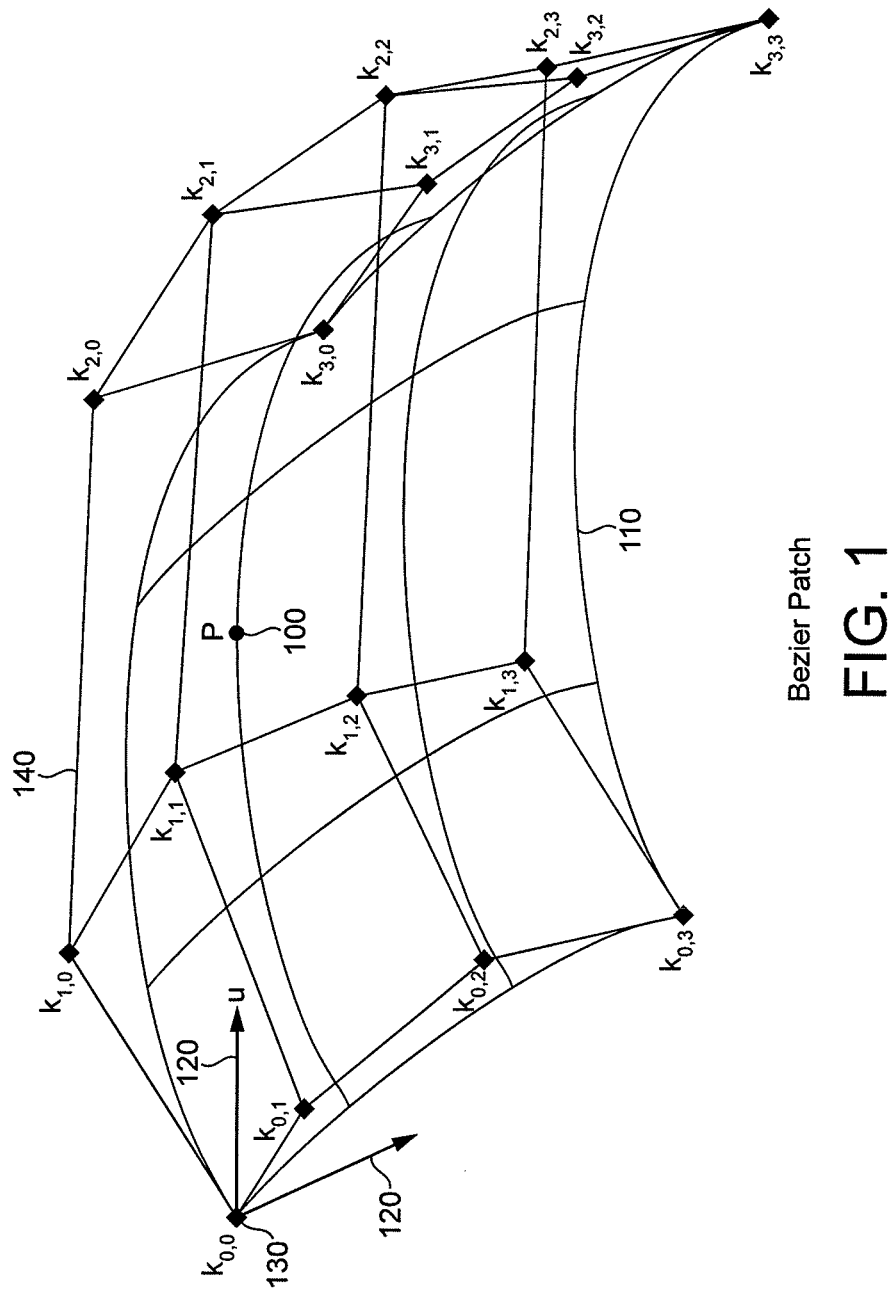
FIG. 1—shows a Bezier patch.
Figure 2:
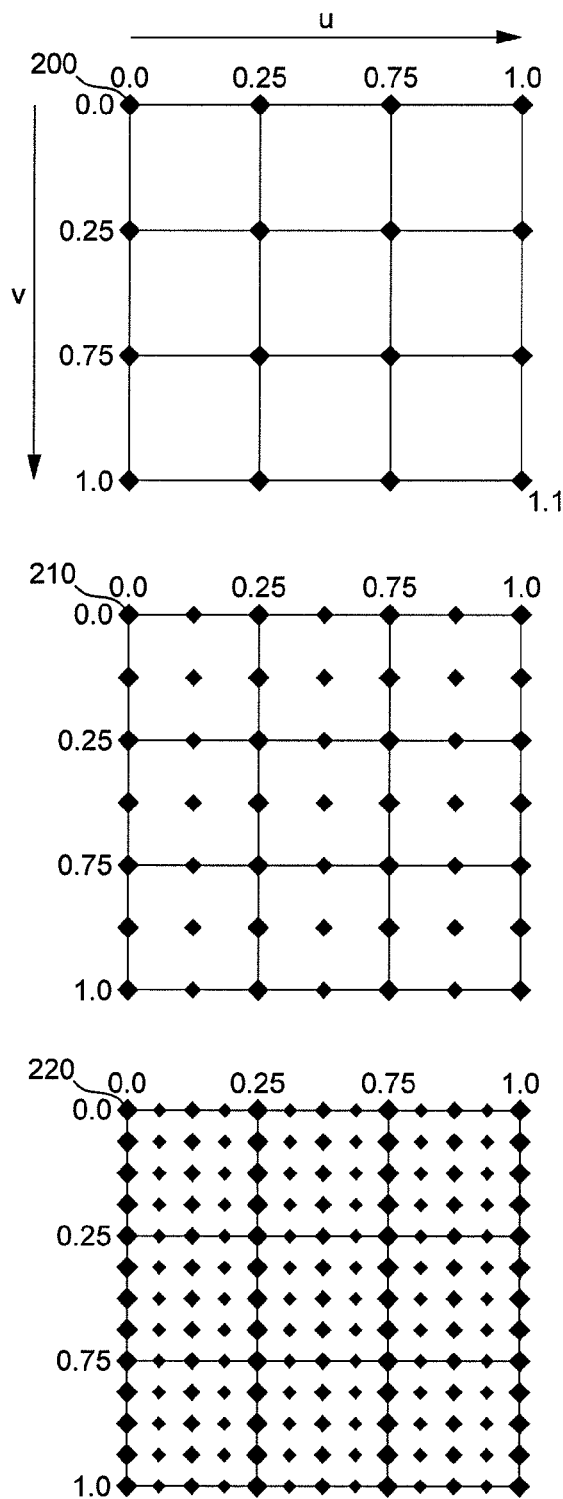
FIG. 2—illustrates the process of tessellation using binary sub-division.
Figure 3:
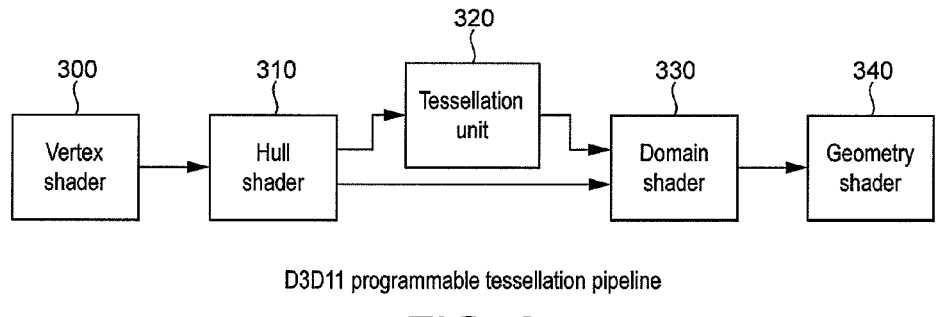
FIG. 3—illustrates the D3D11 programmable tessellation pipeline.
Figure 4:
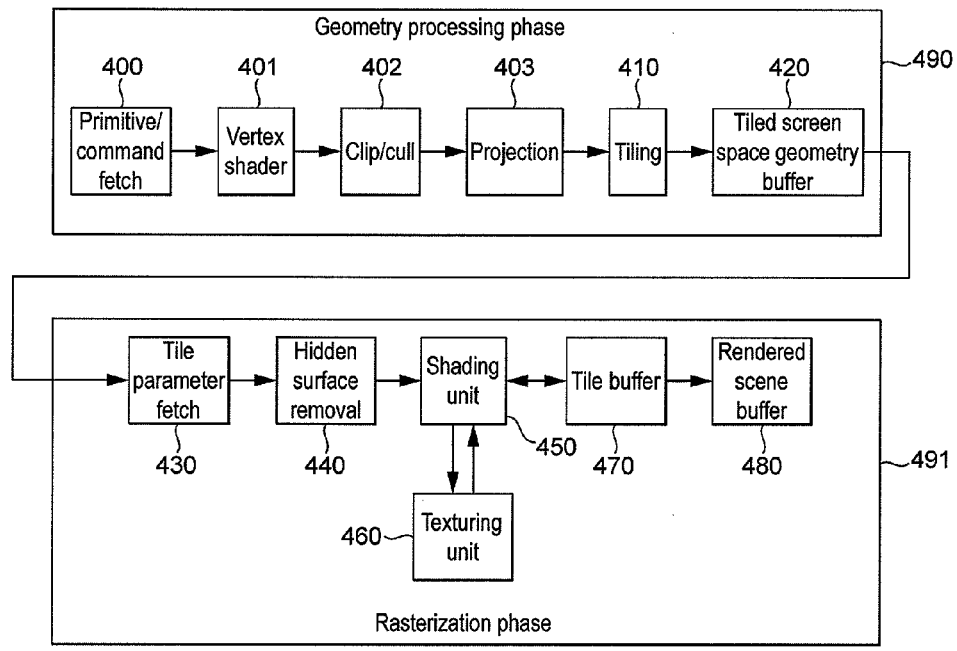
FIG. 4—shows a schematic diagram of a known tile based rendering system.
Figure 5:
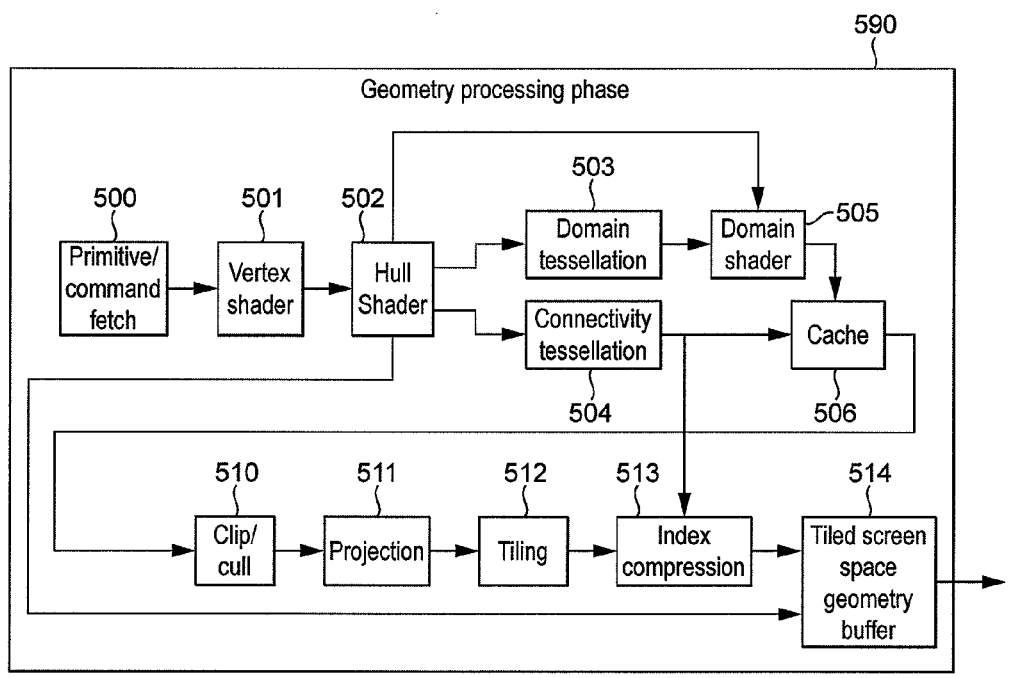
FIG. 5—illustrates the Geometry Processing Phase of a tile based rendering system extended to include programmable tessellation.
Figure 6:
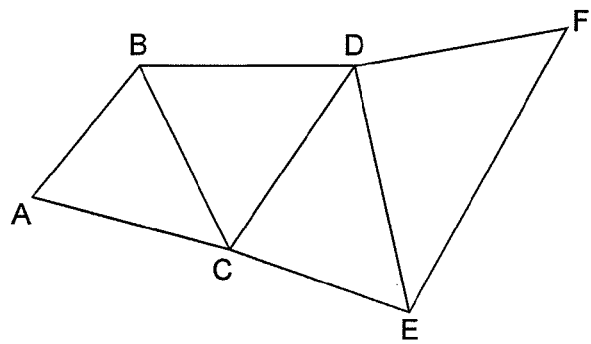
FIG. 6—illustrates an example triangle strip mesh.
Figure 7:
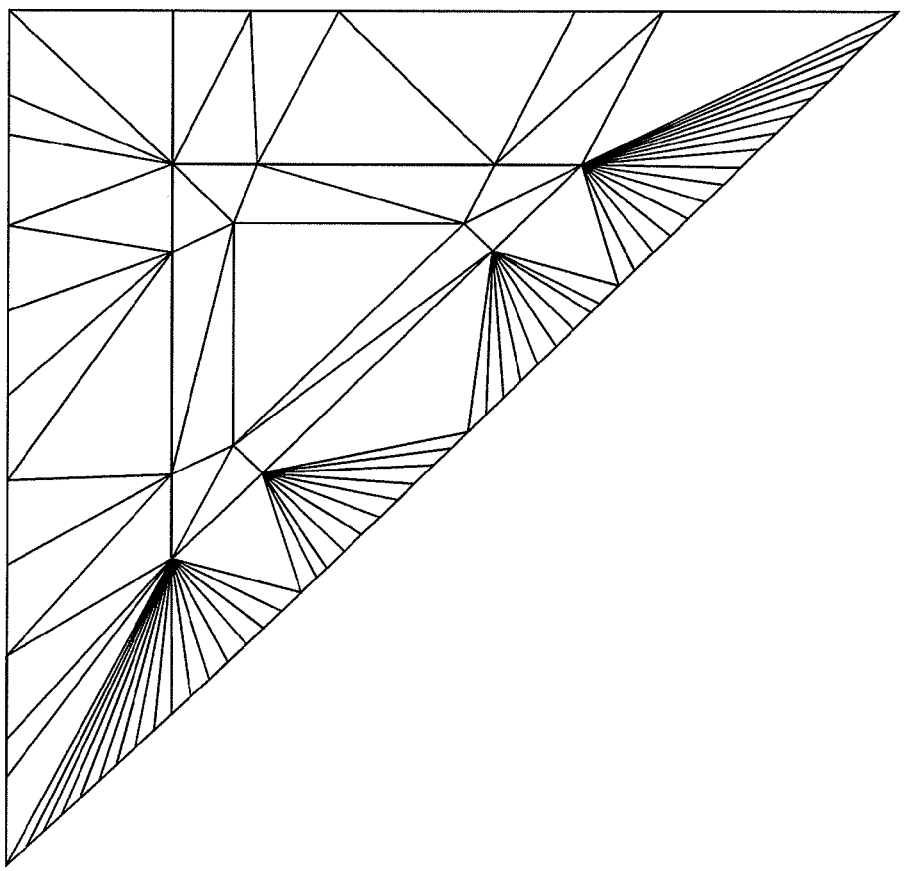
FIG. 7—illustrates an a D3D11 triangular patch using triangular primitives, created using odd partitioning, minimum internal reduction and edge tessellation factors of 4, 10 and 50.

In many applications it is desirable to preserve the connectivity information of the initial tessellation of the patch in order to avoid recalculation of tessellation connectivity later in the pipeline. A compression scheme that preserves connectivity information is therefore required. Consider the tessellation of a quad patch into triangular primitives as shown in FIG. 14. An uncompressed domain point index list for primitives in the tessellated patch is included in the table. Data in this uncompressed domain point index format cannot be sorted by a simple run length encoding of differences without sorting. Similarly, the presence of triangle fans of the type shown in FIG. 7 and abrupt changes in primitive ordering limits the achievable compression with conventional compression schemes such as triangle strips due to the associated additional overhead at every discontinuity. Higher levels of tessellation as previously shown in FIG. 7 can contain significantly more triangle fans and triangle strip transitions. The most suitable conventional compression mechanism is therefore conventional Index Buffer Compression.

In D3D11 each patch can be tessellated into up to 4225 domain points. Using triangular connectivity tessellation this translates into 8192 triangle primitives. If each triangle primitive created by the tessellation process is defined by three domain point indices the tessellated patch would require 24,756 domain point indices. Storing primitives in an uncompressed form would require 13 bits per domain point index and potentially 24,756*13=42.3 kilobytes of data just for the primitive mesh. The details of how many domain points/triangles can be produced by D3D11's tessellation algorithm are fully defined in the specification of D3D11, details are provided merely for reference and context.

Conventional Index Buffer Compression reduces this storage requirement. If a domain point index in the current primitive is present in the buffer or previous domain point indices then only the position in the buffer need be stored rather than a full domain point index. In the case of triangular primitives generated by D3D11's tessellation algorithm, a 13-bit domain point index value that is present in the buffer could be replaced by a 2 bit buffer position (assuming the buffer contains only the three domain point indices of the previous triangle primitive seen). It is worth noting that in order to use Index Buffer Compression a 1-bit flag is required before each index value to indicate if the domain point index value that follows is a full 13-bit domain point index value or a 2-bit buffer position.

FIG. 14 shows the results of applying conventional Index Buffer Compression to the uncompressed primitive domain point index list. The buffer contains the three domain point indices of the previous triangle primitive. Values in square brackets indicate the buffer position of the required domain point index, where [0] is the first value in the buffer. In creating a bit stream output, each domain point index that is not present in the buffer must be represented by a '0' bit, indicating the index is not present in the buffer, followed by a full 13-bit index value. Each domain point index that is present in the buffer should be represented by a '1' bit, indicating the index is present in the buffer, followed by a 2-bit buffer position. The resulting Index Buffer Compressed Bit Stream for the tessellated patch shown is provided.

It can be seen that the uncompressed storage of the tessellated patch requires 18 triangle primitives, each defined by 3*13-bit index values=702 bits. Conventional Index Buffer Compression is able to store the same geometry with 21 full domain point index values each requiring 14 bits (1-bit buffer miss flag followed by a 13-bit domain point index value) and 33 buffer positions (1-bit buffer hit flag+2-bit buffer position). This equates to (21×14)+(33×3)=393 bits. The compression achieved is therefore approximately 44%.

This conventional Index Buffer Compression method is improved upon by the addition of one or more predicted domain point index values in the buffer. Generating an effective prediction mechanism for an arbitrarily numbered primitive mesh is not possible. By constraining the compression scheme to the tessellation application the inherent locality and underlying structure of the domain point indices can be used to generate effective domain point index predictions. A highly successful domain point index prediction scheme that uses only the domain point indices (i.e. the values in the buffer) can be achieved using a method embodying the invention.

Figure 24:
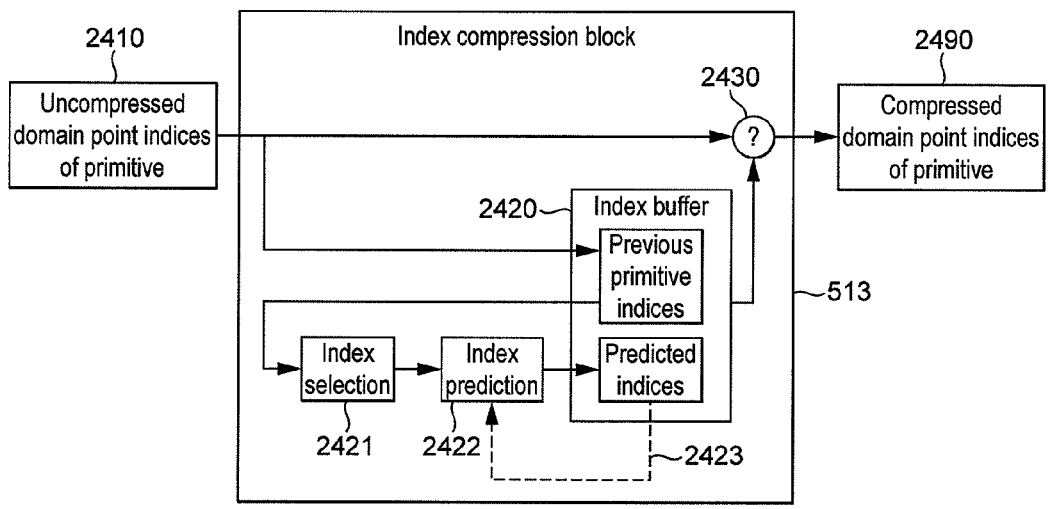
FIG. 24—illustrates the apparatus of an Index Compression Block using the disclosed Index Buffer Compression with Domain Point Index Prediction method.

FIG. 24 illustrates the modified apparatus of the Index Compression Block. In this architecture, lists of indices from recently seen primitives are stored in an Index Buffer 2420. The Index Buffer is extended to include one or more predicted domain point index values. Index selection 2421 identifies the domain point index value present in the previous primitive indices that will be used as the basis of the predicted index value(s) henceforth called the Selected Index. The selection method is disclosed in this patent. The selected index is then modified according to the method disclosed in this patent by the Index Prediction 2422 to generate one or more predicted index values using a prediction modifier. Optionally predicted index values that already exist in the Index Buffer can be removed by further modification in the Index Prediction 2423. When a new primitive is added, the uncompressed Domain Point Indices of the primitive 2410 are compared 2430 with the Index Buffer including both the Previous Primitive Indices and the Predicted Indices. Any index value already present can be represented by a buffer position in the Index Buffer including Prediction in place of storing the full index value. Assuming the position in the Index Buffer with Prediction can be described by fewer bits than the index value itself, compression is achieved 2490.

The domain point index prediction scheme is dependent upon the type of primitive used by the tessellation algorithm. In the case of point primitives, a point is defined by a single domain point index. After processing the current primitive with domain point index A, the next domain point index is likely to be A+1. We can say the selected index is domain point index A and the prediction modifier is +1. Accordingly a predicted domain point index value of A+1 may be generated and stored in the index buffer.

In the case of line primitives, a line is defined by two domain point indices A and A+1. After processing the current primitive, indices A and A+1 are stored in the Index Buffer and require only a 1-bit buffer position. By extending the buffer to contain a predicted index value a 2-bit buffer position is required. A two bit buffer position code allows four index values to be accessed, i.e. the two indices for the previous line primitive and two predicted index values. For line primitives, two effective predicted Domain Point Index values are therefore, A+2 and A+3 (i.e. the highest domain point index value is used as the selected index (i.e. A+1) and the prediction modifiers are the selected index plus one and the selected index plus two).

Figure 15:
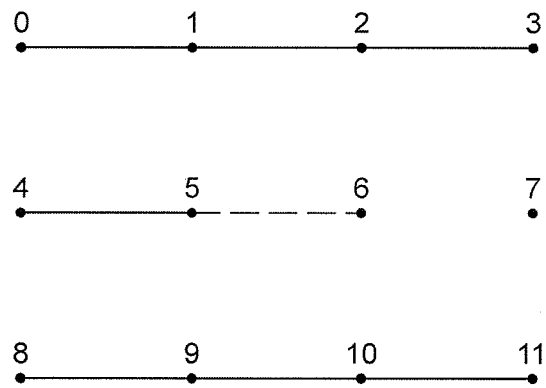
FIG. 15—illustrates the prediction of the next domain point in D3D11 line primitive tessellation of a quad patch.

FIG. 15 shows the benefit afforded by including a domain point index value of the highest domain point index value in the buffer plus one. The previous line primitive was defined by domain point indices {4,5}. The predicted index values are therefore {6,7}. It can be seen that the next line primitive in the patch is defined by domain point indices {5,6}. Both of these indices are present in the Index Buffer with predicted indices (one from the previous primitive and the other a predicted index value) so effective prediction and therefore compression has been achieved.

Figure 16:
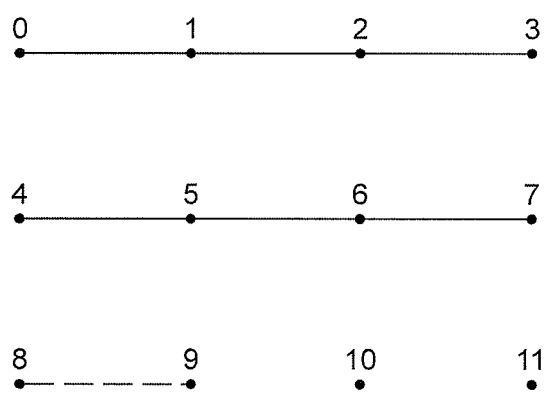
FIG. 16—illustrates the prediction of the next domain point in D3D11 line primitive tessellation of a quad patch when a new row is encountered.

FIG. 16 shows the benefit afforded by including two predicted domain point index values of the highest domain point index value in the buffer plus one and the highest domain point index value plus two. The previous line primitive was defined by domain point indices {6,7}. The predicted index values are therefore {8,9}. It can be seen that the next line primitive in the patch is on a new row and therefore reuses none of the previous primitive's indices. Accordingly, a conventional Index Buffer Compression system would not include either of the required domain point index values. It can be seen that the next line primitive in the patch is defined by domain point indices {8,9}. Both of these indices are present in the Index Buffer with predicted indices (both were predictions) so effective prediction and therefore compression has been achieved.

Figure 17:
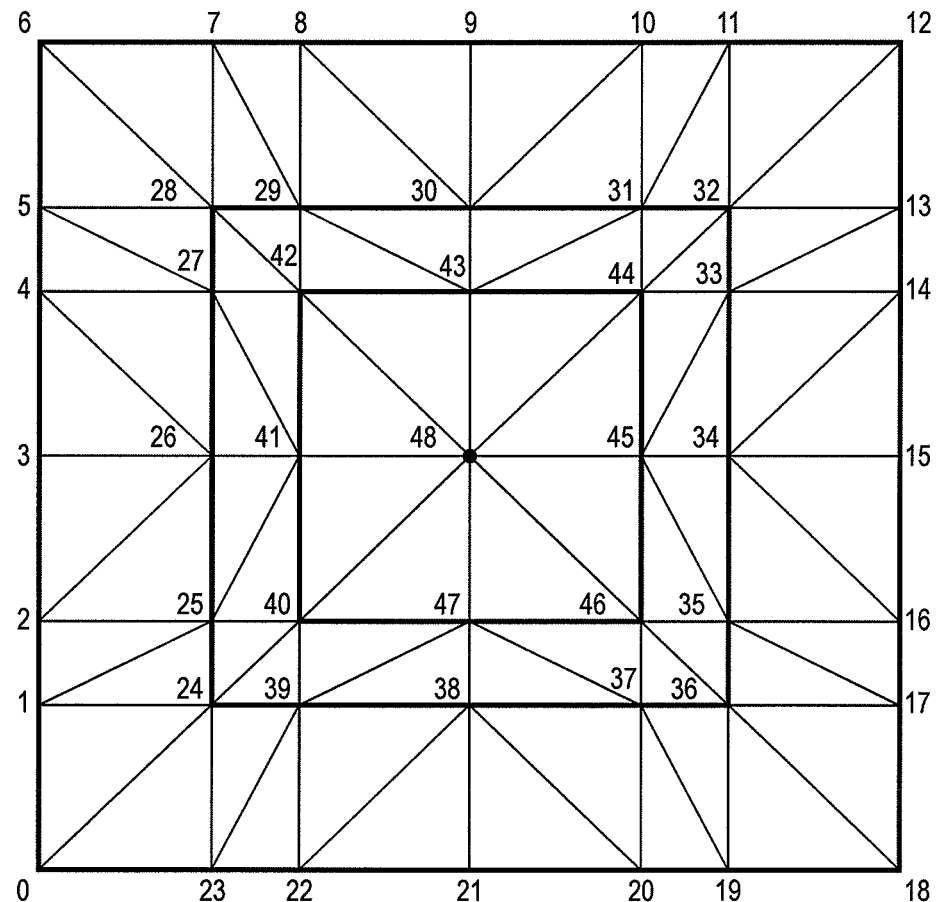
FIG. 17—illustrates the ring structure of domain indices in a D3D11 tessellated quad patch.

In the case of triangular primitives, the geometric structure of a tessellated patch can be seen to consist of a series of concentric rings of domain points. A simple example of triangular tessellation of a quad patch with an even tessellation factor of 5 applied to each edge is shown in FIG. 17. This patch can be seen to consist of only four rings which are defined by the domain point index ranges {0, . . . , 23}, {24, . . . , 39}, {40, . . . , 47} and a final inner ring consisting of a single domain point index {48}. It can be seen that each triangle primitive created in the patch spans between two rings, with at least one of the triangle primitive vertex located on the outer ring edge and at least one triangle primitive vertex located on the inner ring edge. Each triangle primitive in the patch can therefore be defined in terms of a domain point index on the outer ring edge (A) and a domain point index on the inner ring edge (B). We can therefore specify each primitive as being created either by connecting two domain points on the outer ring edge (A, A+1) with one domain point on the inner ring edge (B), or, one domain point on the outer ring edge (A) with two domain points on the inner ring edge (B, B+1). Henceforth the domain point on a ring by itself will be referred to as the 'lone domain point index'. The two adjacent domain points on the other ring will be referred to as the 'domain point index pair'.

Each triangle primitive in the tessellated patch is defined by three domain point indices. The previous primitive's domain point indices are stored in the conventional Index Buffer. These three indices can be accessed with a two bit code leaving a fourth code value to indicate one predicted domain point index value. An efficient prediction scheme for the required domain point index value in the next primitive is disclosed. The predicted domain point index value is the lone domain point index value plus one. Note: for counter clockwise defined triangles the predicted domain point index value would be the lone domain point index value minus one.

Figure 18:
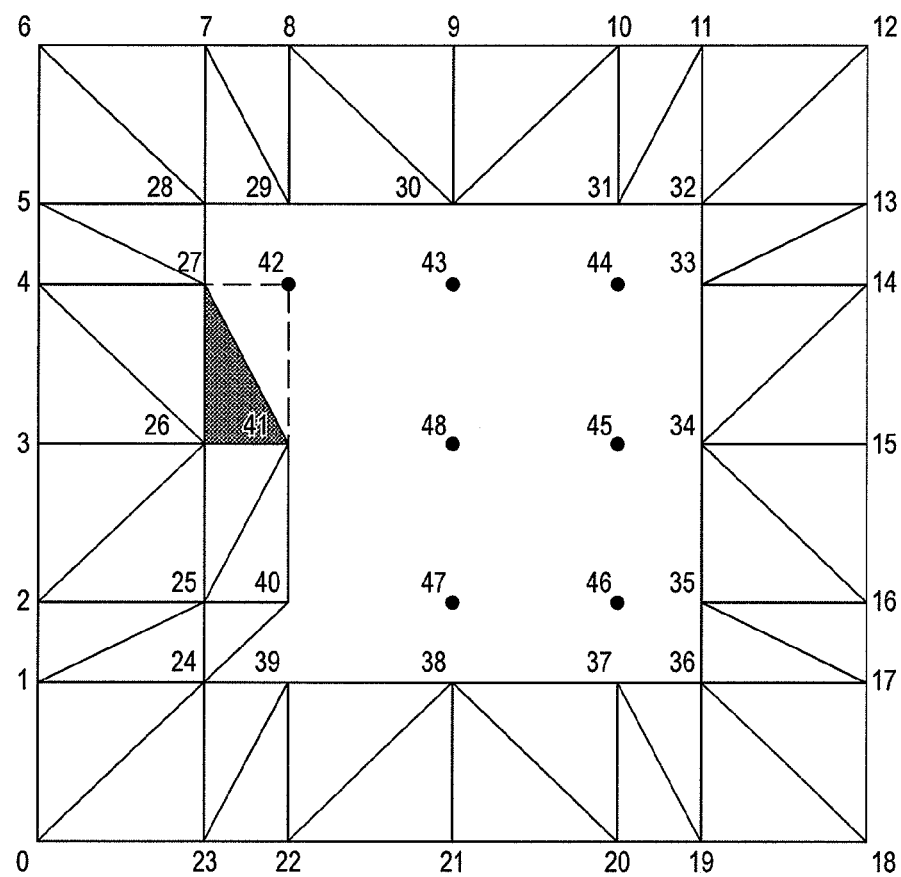
FIG. 18—illustrates domain point index prediction for the next domain point in D3D11 triangle primitive tessellation of a quad patch.

FIG. 18 shows the benefit afforded by including a domain point index value of the lone domain point index value in the buffer plus one (i.e. the lone domain point index is used as the selected index and a prediction modifier of +1 is applied). The previous triangle primitive was defined by domain point indices {26, 27, 41}. It can be seen that the values in the index buffer consist of two adjacent domain point index values {26,27} which must be the domain point index pair and an isolated domain point index value {41} which must be the lone domain point index. Determining the lone domain point index can therefore be achieved directly from the values stored in the Index Buffer without requiring additional information about from the tessellator about the current ring being processed.

Accordingly, a predicted value one higher than the lone domain point index value is added to the Index Buffer forming an Index Buffer with Prediction containing domain point index values {26, 27, 41, 42}. The next primitive in the patch is defined by domain point indices {41, 27, 42} which are all present in the buffer (two from the previous primitive and one from the disclosed domain point index prediction method) so effective prediction and therefore compression has been achieved.

An alternative prediction method (or complimentary prediction method in environments with larger index buffers) is to store the domain point index value at the start of the outer ring. This domain point is likely to be reused because the final triangle in a ring will typically join onto the first triangle in the ring. While generally inefficient in comparison to the lone domain point index plus one prediction scheme disclosed above it becomes more useful when tessellation factors are small, or when storing triangles in the inner rings when the tessellation factors are large. It is also a better candidate than simply maintaining the domain points from an earlier triangle primitive as would commonly be employed in a conventional Index Buffer without prediction.

A minority of triangular primitives in a patch may be defined in such a way that the lone domain point index value and a domain point index pair cannot be determined directly from the values present in the buffer. This case can be seen in FIG. 8 where a tessellated quad patch contains a triangle primitive defined by domain point indices {12, 13, 14}. As all three domain point indices are sequential it is non-obvious which domain point index value is the lone domain point index value and should be used as the selected index. Alternatively, situations may arise where three non incrementing domain point indices define a triangle primitive. This case can be seen in FIG. 8 where a tessellated quad patch contains a triangle primitive defined by domain point indices {15, 10, 12}. As all three domain point indices are non-sequential it is non-obvious which domain point index value is the lone domain point index value to be used as the selected index. In these situations an alternative index selection method must be used. Suitable alternative schemes include adding a prediction modifier that is one value above or below the smallest, median or maximum domain point index value present in the buffer or as previously described, adding the first domain point index value of the outer ring. Worked examples that follow in this patent will apply a general rule to these special cases where a lone domain point index value cannot be identified: the selected domain point index value will be the median domain point index value in the buffer with a prediction modifier of plus one. This will be indicated in figures by the word "MED".

In order to optimize the efficiency of the buffer it is also desirable to avoid repetition that may arise if the predicted domain point index value is already present in the buffer. In these situations the predicted domain point index value could be replaced by one of the alternative prediction schemes outlined above or incremented until a domain point index value that is not already present in the buffer is found. Worked examples that follow in this patent will apply a general rule in this duplicate buffer index case: replace the predicted domain point index value with the maximum domain point index value in the buffer plus one. This will be indicated in figures by the word "MAX".

Figure 19:
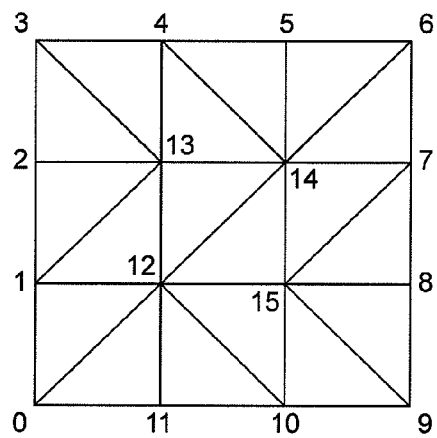
FIG. 19—illustrates the compression of a D3D11 tessellated quad patch using Index Buffer Compression with Prediction derived from the lone apex.

FIG. 19 illustrates Index Buffer Compression with Prediction, using the same quad patch previously compressed with conventional Index Buffer Compression and illustrated in FIG. 14. The index buffer begins empty and the first primitive is generated with domain point indices {0, 1, 12}. Note: rather than starting with an empty buffer the Index buffer could be seeded with some predicted values such as {0, 1, 2, 3} or the first two domain point index values taken from the outer two rings, i.e. {0,1} and {12,13}. Assuming an initially empty index buffer, the first three domain point index values defining the first primitive in the patch must be stored using full domain point index values.

It has previously been shown that uncompressed storage of the tessellated patch requires 18 triangle primitives, each defined by 3*13-bit index values=702 bits (0% compression). Conventional Index Buffer Compression reduced this to 21 full domain point index values each requiring 14 bits (1-bit buffer miss flag followed by a 13-bit domain point index value) and 33 buffer positions (1-bit buffer hit flag+2-bit buffer position)=393 bits (44% compression). It can be seen that the Index Buffer Compression with Prediction reduces this further to 15 full domain point index values each requiring 14 bits (1-bit buffer miss flag followed by a 13-bit domain point index value) and 39 buffer positions (1-bit buffer hit flag+2-bit buffer position)=327 bits (55% compression). It can be seen even from this simple example that Index Buffer Compression with Prediction represents a significant reduction in data required to represent the tessellated patch.

One common data structure in the triangular tessellation of a patch is the triangle strip. This form of repeating geometry occurs mostly along the edges of rings in highly tessellated patches. It is disclosed that accurate domain point index value predictions in the Index Buffer with Prediction method give rise to a repeating pattern of buffer position accesses at repeated geometry which includes triangle strips.

FIG. 20 illustrates a typical triangle strip after Index Buffer Compression with Prediction. It is apparent that generating predictions using the lone domain index value plus one method is highly effective in this triangle strip scenario, as illustrated by every domain point index value being correctly predicted and present in the Index Buffer. It can be seen that after the initial triangle is declared, a repeating pattern of buffer access patterns is established, i.e. {[2], [1], [X]} followed by {[1], [X], [2]}. It is important to note that the buffer position values will always be dependent on the ordering of the domain point indices used in the first triangle of a sequence. It is therefore not specifically the pattern of {[2], [1], [X]} followed by {[1], [X], [2]}. If the ordering of the first triangle's domain point indices been different then a different order such as {[3], [2], [X]} followed by {[X], [3], [2]} may have emerged. However, notice that the repeated pattern makes extensive use of the predicted domain point index, [X].

The repetition of buffer access patterns is only possible due to the presence of an accurate predicted domain point value in the buffer. Having identified that the buffer access patterns are repetitive, they can be further compressed. The proposed method of compressing these buffer access patterns is to first specify the two initial buffer accesses at the start of the repeating pattern followed by a repetition value indicating how many times the buffer access pattern should be repeated. In the example of FIG. 20 this would have the following structure:

{A, A+1, B},
{[2], [1], [3]}, {[1], [3], [2]}
REPEAT 2 TIMES
[2], [1], [X]

This can be further improved by allowing fractional values for the number of times the buffer access patterns should be repeated, e.g.:

{A, A+1, B},
{[2], [1], [X]}, {[1], [X], [2]}
REPEAT 2.5 TIMES

While Index Buffer Compression with Prediction aims to accurately predict the domain point index values required by the next primitive, situations will arise where the prediction is not correct. In these situations a full domain point index value will need to be stored. Not having the required index values present in the Index Buffer can commonly occur at the first primitive from a patch and when primitives are missing from the tessellated patch (a situation that may arise due to tiling).

It is therefore desirable to specify the domain point index values that are not present in the Index Buffer in a compressed form. Typically a domain point index value in a D3D11 patch requires 13 bits to cover the range of possible values. Rather than store each domain point index value that is not present in the Index Buffer it is possible to pre-compute the range of domain point indices and if this range of domain point index values requires fewer than 13 bits to represent then compression can be achieved and a Compressed Domain Point Index stored. The number of domain point indices present in a patch can readily be determined from the D3D11 domain tessellation algorithm and is independent of the tessellation connectivity process. As the maximum number of domain points for a patch at provided tessellation factors can always be calculated at both compression and later decompression stages, the number of bits used to store each index value is always known without requiring any additional overhead in the bit stream.

Figure 21:
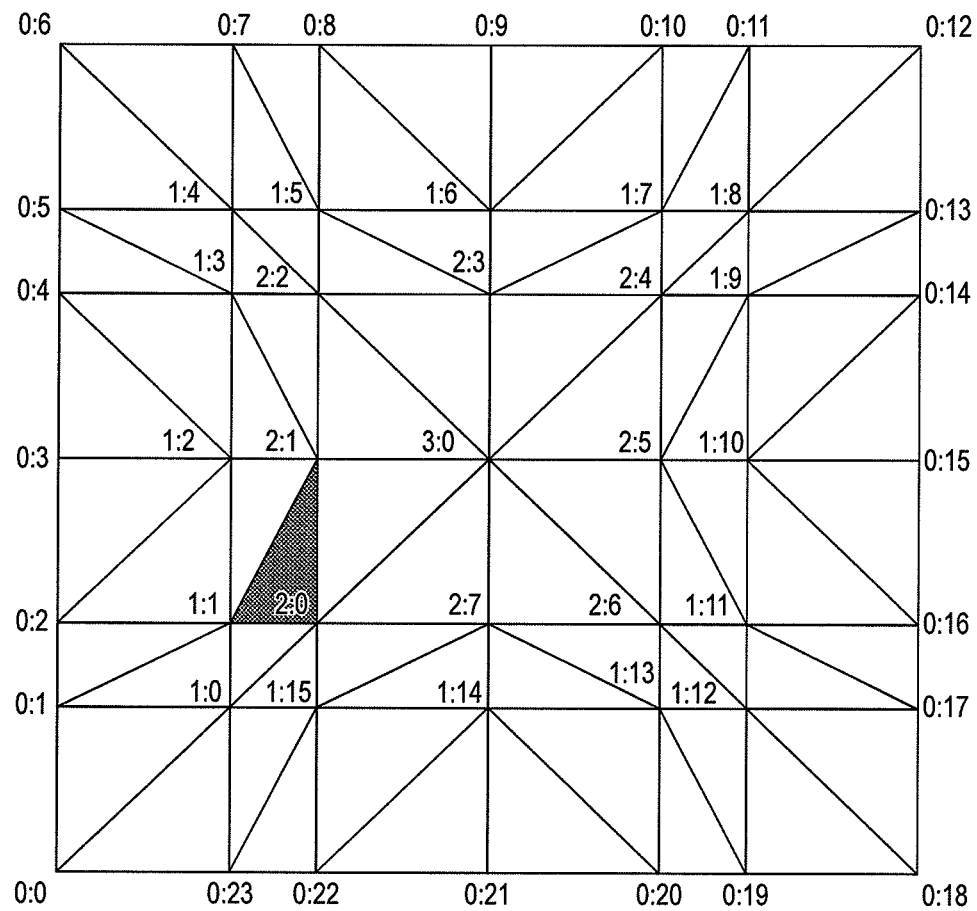
FIG. 21—illustrates the compression of a D3D11 tessellated patch by specifying the domain point indices as a ring number and a ring offset.

In the case of triangle primitives it is disclosed that domain point index values may be further compressed into Compressed Domain Point Indices by defining each domain point index as a ring number and an offset around the selected ring. The ring number defines the base identifier of the compressed domain point index. FIG. 21 illustrates a quad patch after triangle primitive tessellation showing domain point indices numbered as a ring number (R) followed by an offset around the ring (O) in the format R:O. The shaded triangle primitive from this patch could therefore be defines in this format by the compressed domain point indices {2:0, 1:1, 2:1}. It can readily be determined from the D3D11 domain tessellation algorithm and the requested edge tessellation factors how many rings are present in the tessellated patch (in this case 4) as well as the index value of each ring. From this it is known how many bits will be required to represent the maximum number of rings present in the tessellated patch (in this case 2-bits) and the number of bits required to represent an offset around each ring. It is important to note that even at high tessellation levels where many domain points will exist on the outer rings, inner rings will always require fewer bits to represent the maximum offset around the ring. As the number of bits used for the offset around each ring is independent of the number of bits used for the offset around other rings in the patch significant savings can always be achieved.

In the worked example in FIG. 21, a quad patch is tessellated using triangle primitives, even tessellation and a tessellation factor of 5 applied to each edge. It can be pre-calculated from the D3D11 domain tessellation algorithm that the resulting surface will have 49 domain point vertices and will consist of 4 rings. It is also known that from the domain tessellation algorithm that the first domain point index in the rings are 0, 24, 40 and 48. The ring number of each index will always require a maximum of 2-bits. We also know there are 24 domain points in the outer ring (R=0) requiring a 5-bit ring offset, 16 domain points in ring number 1 (R=1) requiring a 4 bit ring offset, 8 domain points in ring R=2 requiring a 3 bit ring offset and a single domain point in ring R=3, requiring no bits for the offset. Accordingly, the ring number will always be defined by a fixed number of bits and from that the number of bits following to define the ring offset is also known.

The shaded triangle defined by the Compressed Domain Point Indices {2:0, 1:1, 2:1} can therefore be fully expressed by the bit stream:

10-000, 01-0001, 10-001

This bit stream comprises a 2-bit ring number followed by a 3-bit ring offset for ring R=2, a 2-bit ring number followed by a 4-bit ring offset for ring R=1 and a 2-bit ring number followed by a 3-bit ring offset for ring R=2. It can be seen that the advance knowledge of how many bits are to be used for each ring's offset allows for an efficient data stream that does not require any overhead to explain how many bits will follow for each ring offset.

In a similar manner the ring number and ring offset method outlined above could further be subdivided into a ring number, an edge number and an offset along each edge.

Figure 22:
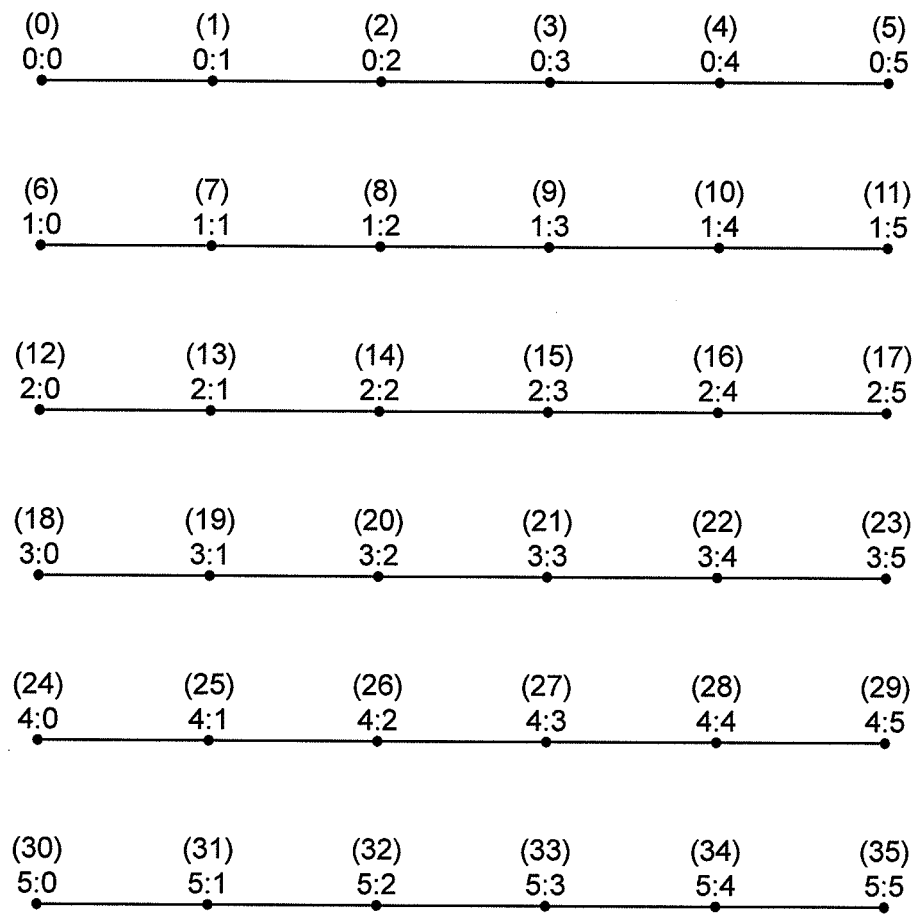
FIG. 22—illustrates the compression of a D3D11 tessellated patch by specifying domain point indices as a line number and a line offset.
Figure 23:
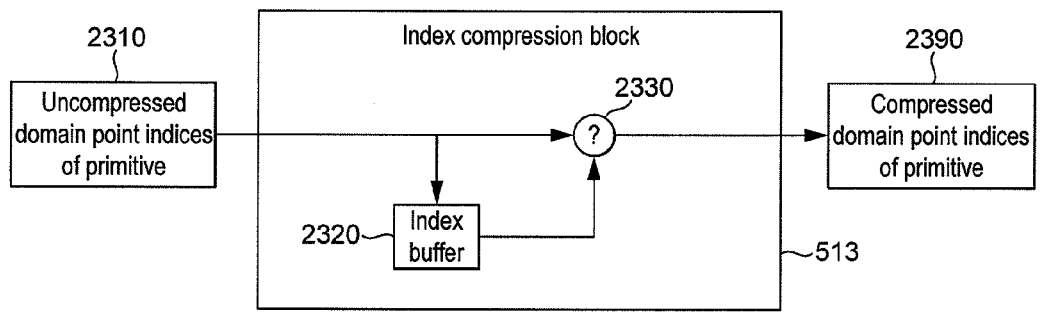
FIG. 23—illustrates the apparatus of an Index Compression Block using a prior art Index Buffer compression method.

In the case of line primitives it is disclosed that domain point index values may be represented as a row number and an offset along that row. The row number defines the base identifier of the compressed domain point index. FIG. 22 illustrates a line primitive tessellated patch with 36 domain points generated. The Compressed Domain Point Indices are shown in brackets with the row number (R) and the row offset (O) provided in the form R:O. In order to represent the range of domain point indices from 0 to 35, a domain point index of 6-bits would be required. Using Compressed Domain Point Indices the 6 line numbers could be defined by a 3-bit value and the 6 offset positions along each line could also be defined by a 3-bit value. Seemingly there is no benefit to the Compressed Domain Point Indices in this example.

It is however disclosed that further compression can be achieved from the realization that several primitives will exist along the same ring/edge/row. In the case of the line primitives described above, the row number need only be defined once per row and all subsequent offsets will continue to use the same row number until the row number is updated. In this case it is necessary to use a 1 bit flag to indicate whether the domain point index that follows should re-use the previous row number ('0') or read in a new row number ('1'). At the beginning of a patch, the current row number can be initialised to R=0, allowing compression even of the first domain point in the patch.

Similarly, in the case of triangle primitives a ring number does not need to be defined for every domain point index. Each primitive will always span between two rings so it is only necessary to keep track of either the outer or inner ring number and specify the ring number component of each domain point index as a one bit flag to identify if the point lies on the outer ring (0) or the inner ring (1). This method reduces the number of bits required to store the ring number component of Compressed Domain Point Indices.

Furthermore, it is common that multiple primitives will exist along the same ring and/or ring edge and therefore the ring/edge numbers do not need to be repeated until a new ring/edge is encountered. This reuse of a ring number is performed in the same manner as the reuse of a line number for multiple domain point indices and further reduces the number of bits required to store the ring number component of Compressed Domain Point Indices.

Figure 25:
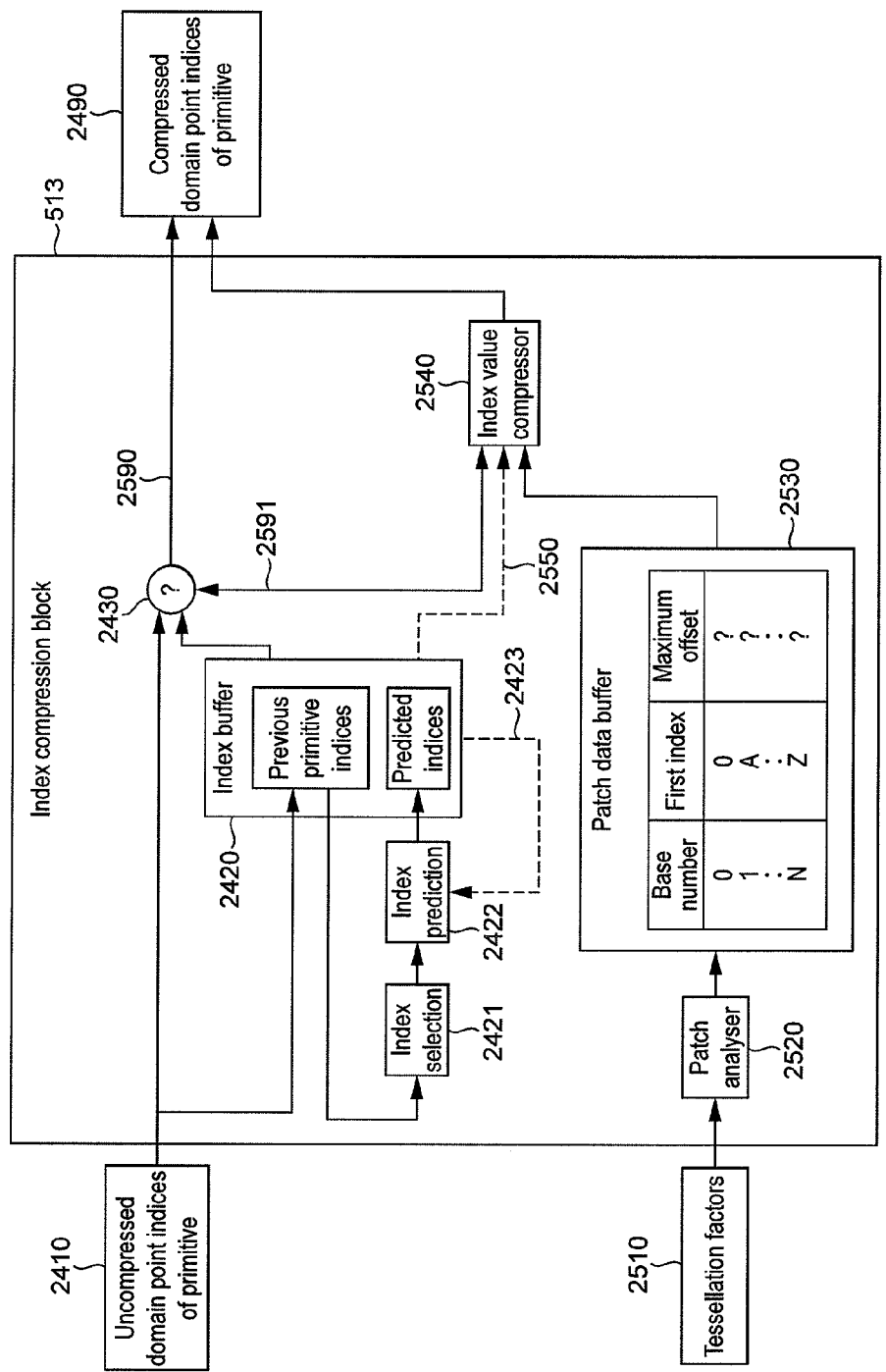
FIG. 25—illustrates the apparatus of an Index Buffer Compression Block using the discloses Index Buffer Compression with Domain Point Index Prediction method extended to include compression of Domain Point Indices that are not present in the Predicted Index Buffer.

FIG. 25 illustrates the apparatus of the Index Buffer Compression with Domain Point Prediction previously shown in FIG. 24, extended to include apparatus for the compression of Domain Point Indices not present in the Index Buffer. Tessellation factors for the current patch 2510 are passed into a Patch Analyser 2520. The Patch Analyser performs a subset of tessellation sufficient to generate the indices of the fully tessellated patch. For each base in the patch (i.e. rings, edges or rows depending upon tessellation mode required) the First Index value is stored in a Patch Data Buffer 2530 or may be generated as required. When the First Index value of two consecutive bases are known, the difference defines the maximum offset along that base. It is therefore possible to use this information to determine the minimum number of bits required to uniquely identify each base and for each base the minimum number of bits required to uniquely identify any offset along each base.

In this architecture, when a new primitive is added, the uncompressed Domain Point Indices of the primitive 2410 are compared 2430 with the Index Buffer 2420 including both the Previous Primitive Indices and the Predicted Indices. Any index value present in the Index Buffer can have its position in the buffer written directly 2590 into the Compressed Domain Point Index List 2490 (along with a flag to indicate a buffer hit has occurred). In the case where the index value is not available in the index buffer 2591, the index is passed to the Index Value Compressor 2540 to be converted into a base number and an offset. The Index Value Compressor uses the data available in the Patch Data Buffer to determine which base the index belongs to and the offset along that base. This compressed index can then be stored in the Compressed Domain Point Indices List 2490 using the minimum number of bits necessary to store each term with no overhead to specify how many bits will be used for the base and the offset terms or flags to indicate where one number ends and the next begins. In the simplest compression format this compressed data may consist of 1) a 1-bit flag to indicate a buffer miss; 2) a base number using only enough bits to identify which of the possible bases that are present in the current patch; 3) an offset using only enough bits to identify the range of possible offsets along the current base.

The Index Value Compressor may be configured to produce other output formats as disclosed in this patent. Some of these other output formats require the Index Value Compressor to be aware of previous indices to identify indices occurring along the same base or spanning between two adjacent bases. It can achieve this through either a local buffer/history or by using data already present in the Index Buffer 2420 through optional connection 2550.

The disclosed compression of tessellated geometry data resulting from the tessellation of patches represents a considerable reduction in the number of bits required to store the domain point index lists written to memory when compared to conventional geometry compression methods.

I claim:

1. A method for compressing a list of primitives in a computer graphics system from a tessellated patch of surface data, the method comprising:
   a) receiving domain point indices for a first primitive in a list of primitives defining the tessellated patch;
   b) storing the domain point indices for the received primitive in a buffer;
   c) comparing domain point indices of a next primitive in the list with the domain point indices stored in the buffer and determining any matches;
   d) storing in the buffer the domain point indices of the next primitive, or, where a match was found in the buffer, storing a reference to the position of the matched index;
   e) receiving domain point indices of a next primitive in the list; and
   repeating c) to e) until each primitive in the list of primitives has been compressed, wherein the storing the domain point indices in the buffer includes storing of a predicted domain point index which is computed from the domain point indices stored in the buffer and outputting compressed domain point indices for the tessellated patch from the buffer.

2. A method according to claim 1, further comprising determining the predicted domain point index value for a point or line primitive to be a maximum domain point index value stored in the buffer plus one.

3. A method according to claim 2, further comprising determining a second predicted domain point index value for a point or line primitive to be the predicted domain point index plus one.

4. A method according to claim 1, wherein the predicted domain point index value for a clockwise-defined triangular primitive is determined to be one greater than a lone domain point index value on a ring of indices within a tessellated patch stored in the buffer and a counter clockwise defined triangular primitive is determined to be one less than a lone domain point index value on a ring of indices within a tessellated patch stored in the buffer.

5. A method according to claim 1, wherein a predicted domain point index value is already present in the buffer, and the method comprises generating an alternative predicted domain point index value candidate by either incrementing or decrementing the highest index value in the buffer by one.

6. A method according to claim 1, wherein a sequence of buffer access patterns is compressed by defining a starting sequence, followed by a number of times the sequence should be repeated.

7. A method according to claim 1, further comprising storing data for a primitive, from the tessellated patch, to be omitted from the list of primitives in place of data for a primitive, from the tessellated patch, which is to be included in the list of primitives.

8. A method according to claim 1, wherein tessellated primitives are stored in a tile.

9. A method for compressing domain point indices in a tessellated patch comprising splitting, within a splitter, a domain point index value into a base identifier, which indicates a base position, and an offset from that base position, wherein the base identifier comprises a row number for point or line primitives or a ring/edge number for triangular primitives.

10. A method according to claim 9, wherein a triangular primitive is defined by a single ring number with a per-vertex flag to indicate if the vertex lies on the inner or the outer edge of the ring.

11. A method according to claim 9, wherein indices assume the previous primitive's base identifier if a new base identifier is not defined and the offset incremented with a flag rather than having its value explicitly defined.

12. A method according to claim 9, wherein the minimum number of bits required are used to store the base identifier and the offset components of the domain point index as determined from the tessellation parameters.

13. Apparatus for compressing a list of primitives in a computer graphics system from a tessellated patch of surface data, comprising;
   a) a receiver for receiving domain point indices for a first primitive in a list of primitives defining the tessellated patch and for receiving subsequent primitives in the list;
   b) a buffer for storing the domain point indices for the received primitive;
   c) a comparator for comparing domain point indices of a next primitive in the list with the domain point indices stored in the buffer and determining any matches;
   d) wherein the buffer stores the domain point indices of the next primitive in the list or, where a match was found in the buffer, a reference to the position of the matched index;
   e) wherein the buffer for the domain point indices includes a predicted domain point index which is computed from the domain point indices stored in the buffer; and
   f) an output for compressed domain point indices from the buffer for the tessellated patch.

14. Apparatus according to claim 13, wherein the predicted domain point index for a point or line primitive is determined to be a maximum domain point index value stored in the buffer, plus one.

15. Apparatus according to claim 14, wherein a second predicted domain point index value for a point or line primitive is determined to be the predicted domain point index plus one.

16. Apparatus according to claim 13, wherein the predicted domain point index value for a clockwise defined triangular primitive is determined to be one greater than a lone domain point index value on a ring of indices within a tessellated patch stored in the buffer, and a counter clockwise defined triangular primitive is determined to be one less than a lone domain point index value on a ring of indices within a tessellated patch stored in the buffer.

17. Apparatus according to claim 13, wherein a predicted domain point index value is already present in the buffer, and the apparatus generates an alternative predicted domain point index value candidate by either incrementing or decrementing the highest index value in the buffer by one.

18. Apparatus according to claim 13, wherein the apparatus is configured to compress a sequence of buffer access patterns by defining a starting sequence, followed by a number of times the sequence should be repeated.

19. Apparatus according to claim 13, wherein data for a primitive from the tessellated patch, which is to be omitted from the list of primitives is stored in place of data for primitives from the tessellated patch that are to be included in the compressed list of primitives.

20. Apparatus according to claim 13, wherein tessellated primitives are stored in a tile store.

21. Apparatus for compressing domain point indices in a tessellated patch comprising a splitter for splitting a domain point index value into a base identifier and an offset from that base identifier, wherein the base identifier comprises a row number for point or line primitives or a ring/edge number for triangular primitives.

22. Apparatus according to claim 21, wherein a triangular primitive is defined by a single ring number with a per-vertex flag to indicate if the vertex lies on the inner or the outer edge of the ring.

23. Apparatus according to claim 21, wherein indices assume the previous primitive's base identifier if a new base identifier is not defined and the offset incremented with a flag rather than having its value explicitly defined.

24. Apparatus according to claim 21, wherein the minimum number of bits required are used to store the base identifier and the offset components of the domain point index as determined from the tessellation parameters.

* * * * *